(12) United States Patent
Johnson, Sr. et al.

(10) Patent No.: US 11,815,222 B2
(45) Date of Patent: Nov. 14, 2023

(54) TRAVEL TRIPOD

(71) Applicant: Really Right Stuff, LLC, Lehi, UT (US)

(72) Inventors: Joseph M. Johnson, Sr., Lehi, UT (US); Verent Chan, Lehi, UT (US); Garrett Christensen, Lehi, UT (US); Ricky Wai, Lehi, UT (US); Matthew L. Burk, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

(21) Appl. No.: 17/933,355

(22) Filed: Sep. 19, 2022

(65) Prior Publication Data

US 2023/0010388 A1    Jan. 12, 2023

Related U.S. Application Data

(63) Continuation of application No. 17/125,564, filed on Dec. 17, 2020, now Pat. No. 11,480,290.

(60) Provisional application No. 62/951,326, filed on Dec. 20, 2019.

(51) Int. Cl.
    *F16M 11/28*    (2006.01)
    *F16M 11/24*    (2006.01)

(52) U.S. Cl.
    CPC ........... *F16M 11/28* (2013.01); *F16M 11/242* (2013.01); *F16M 2200/028* (2013.01)

(58) Field of Classification Search
    CPC . F16M 11/28; F16M 11/242; F16M 2200/028
    USPC ............................................ 248/177.1, 178.1
    See application file for complete search history.

(56) References Cited

U.S. PATENT DOCUMENTS

| | | | |
|---|---|---|---|
| 911,508 A | 2/1909 | Look | |
| 918,817 A * | 4/1909 | Berger | F16M 11/12 384/253 |
| 1,708,761 A * | 4/1929 | Horbath | E21D 11/03 248/404 |
| 1,798,446 A * | 3/1931 | Zerk | F16M 11/14 248/183.4 |
| 1,894,456 A * | 1/1933 | Zerk | F16M 11/10 248/187.1 |
| 2,336,104 A * | 12/1943 | Grover | F16M 11/2092 248/183.1 |
| 2,579,348 A * | 12/1951 | Taylor | F16M 11/08 108/4 |
| 2,883,875 A * | 4/1959 | Davidson | F16M 11/242 74/DIG. 10 |
| 3,259,407 A * | 7/1966 | Welt | F16B 7/1427 403/350 |
| 3,741,509 A * | 6/1973 | Kelly | F16M 11/046 248/161 |
| 4,029,279 A * | 6/1977 | Nakatani | F16B 7/1454 403/109.5 |

(Continued)

FOREIGN PATENT DOCUMENTS

CN    2540551 Y  †  3/2003
CN    208365144 U  †  1/2019
(Continued)

*Primary Examiner* — Nkeisha Smith
(74) *Attorney, Agent, or Firm* — Chernoff, Vilhauer, McClung & Stenzel, LLP

(57) ABSTRACT

A tripod suitable for travel.

12 Claims, 44 Drawing Sheets

(56) References Cited

U.S. PATENT DOCUMENTS

| | | | | |
|---|---|---|---|---|
| 4,185,936 A * | 1/1980 | Takahashi | F16B 7/1454 | 248/188.5 |
| 4,596,484 A * | 6/1986 | Nakatani | F16M 11/28 | 403/109.5 |
| 5,072,910 A * | 12/1991 | May | F16M 11/42 | 248/412 |
| 5,222,705 A * | 6/1993 | Gibran | F16M 11/04 | 403/328 |
| 5,341,185 A * | 8/1994 | Nakatani | F16M 11/16 | 396/428 |
| 6,352,228 B1 * | 3/2002 | Buerklin | F16C 11/106 | 248/288.51 |
| 6,983,916 B2 | 1/2006 | Raynaud | F16M 11/2078 | 248/163.2 |
| 7,438,266 B2 * | 10/2008 | May | F16M 11/34 | 248/431 |
| 7,703,725 B2 * | 4/2010 | May | F16M 11/42 | 248/431 |
| 7,718,878 B2 * | 5/2010 | May | F16M 11/18 | 84/422.1 |
| 8,317,141 B2 * | 11/2012 | Fischer | F16M 11/36 | 396/419 |
| 8,398,037 B2 * | 3/2013 | Johnson | F16M 11/32 | 248/168 |
| 8,651,440 B2 * | 2/2014 | Hollinger | F16M 11/32 | 248/176.1 |
| 8,814,111 B2 * | 8/2014 | Hollinger | F16M 11/046 | 248/176.1 |
| 9,004,419 B2 * | 4/2015 | Nakatani | F16M 11/2014 | 248/178.1 |
| 9,188,843 B2 * | 11/2015 | Li | F16M 11/242 | |
| 9,651,073 B2 * | 5/2017 | Bukovitz | F16B 7/1454 | |
| 10,480,707 B2 * | 11/2019 | Guidolin | F16M 11/28 | |
| 10,612,719 B2 * | 4/2020 | Li | F16M 11/245 | |
| 10,802,381 B2 * | 10/2020 | Chen | G03B 17/561 | |
| 10,901,301 B2 * | 1/2021 | Jankura | G03B 17/561 | |
| 10,982,806 B2 * | 4/2021 | Jankura | F16M 11/10 | |
| 11,106,116 B2 * | 8/2021 | Clark | F16M 11/14 | |
| 11,320,724 B2 * | 5/2022 | Jankura | F16M 11/041 | |
| 2004/0004168 A1 * | 1/2004 | Crain | F16M 11/16 | 248/176.1 |
| 2004/0129843 A1 | 7/2004 | Pernstich et al. | | |
| 2005/0016354 A1 * | 1/2005 | Kent | F16M 11/28 | 84/327 |
| 2005/0151036 A1 † | 7/2005 | Spegglorin | | |
| 2006/0086868 A1 * | 4/2006 | White | F16M 11/32 | 248/163.1 |
| 2006/0175483 A1 * | 8/2006 | Osaka | F16M 11/28 | 248/177.1 |
| 2006/0175848 A1 | 8/2006 | Akad | | |
| 2008/0224000 A1 * | 9/2008 | Yang | F16M 11/16 | 248/163.1 |
| 2009/0250567 A1 | 10/2009 | Raynaud | | |
| 2011/0031358 A1 | 2/2011 | Fischer | | |
| 2016/0116103 A1 * | 4/2016 | Gabrielli | F16M 11/24 | 248/125.8 |
| 2016/0161050 A1 * | 6/2016 | Trebesius | F16M 11/38 | 248/122.1 |
| 2018/0324360 A1 * | 11/2018 | Gabrielli | F16M 11/32 | |
| 2021/0190260 A1 | 6/2021 | Johnson, Sr. | | |

FOREIGN PATENT DOCUMENTS

| | | | | |
|---|---|---|---|---|
| EP | 3754242 A1 * | 12/2020 | | F16M 11/046 |
| EP | 3754242 A1 † | 12/2020 | | |

\* cited by examiner

† cited by third party

TRAVEL TRIPOD

CROSS-REFERENCE TO RELATED APPLICATIONS

This application is a continuation of U.S. patent application Ser. No. 17/125,564, filed Dec. 17, 2020, which claims the benefit of U.S. Provisional Patent Application No. 62/951,326 filed Dec. 20, 2019.

BACKGROUND OF THE INVENTION

The present invention relates to a portable support apparatus for equipment, such as a tripod. For convenience, the term "tripod" is used as a generic identifier for a more broad class of equipment supports, which may have any number of legs, e.g., a support with one, two, three, four or more legs.

Tripods have been used for many years. Typically, tripods include an elevated mounting surface, upon which equipment may be secured, such as a camera, telescope, musical equipment, surveying equipment, antenna, etc. The elevated mounting surface is supported by a plurality of legs, which in the case of a tripod is typically three. Other numbers of legs may likewise be used, such as a single leg monopod.

Tripods are designed to provide some optimal balance between a set of features. For example, one feature of a tripod is stability, as it is often desirable to insure that shaking or other movement of equipment supported by the tripod is minimized so that, for example, blur does not occur in an image taken by a camera supported on the tripod. Tripods are often used portably, hence, it is often desired to minimize the weight and/or dimensions of the tripod so that it may be carried over great distances. Also, it is often desirable to include a locking mechanism between different segments of the legs that are efficient to operate while being suitable for use in hostile environments, such as sandy environments and ocean environments.

Many existing tripods are vertically collapsible with radially extendible legs. For example, a tripod may have three leg assemblies, with each leg assembly pivotally connected to the elevated equipment support so that each leg may be pivoted outwards when in use, and inwards when not in use. Also, each leg assembly may have multiple elements that selectively slide axially relative to each other. For example, a multi-stage tripod may have first, second, and third segments for each leg. To adjust the height of the tripod, the first and second leg segments are slidably movable relative to each other and the second and third leg segments are also slidably movable relative to each other. Each pair of legs may be selectively locked and unlocked at different positions. Tripods also may include an adjustable central column to change the height at which equipment is supported by the tripod at a fixed extension of the tripod legs. Further, the tripod legs typically include locking detents so that each of the tripod legs may be positioned at one of a plurality of fixed angular orientations. The telescopic tube structure may comprise an outer tube, an inner tube elastically sleeved by the outer tube, and a locking structure for locking two adjacent connection tubes into an integral piece.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
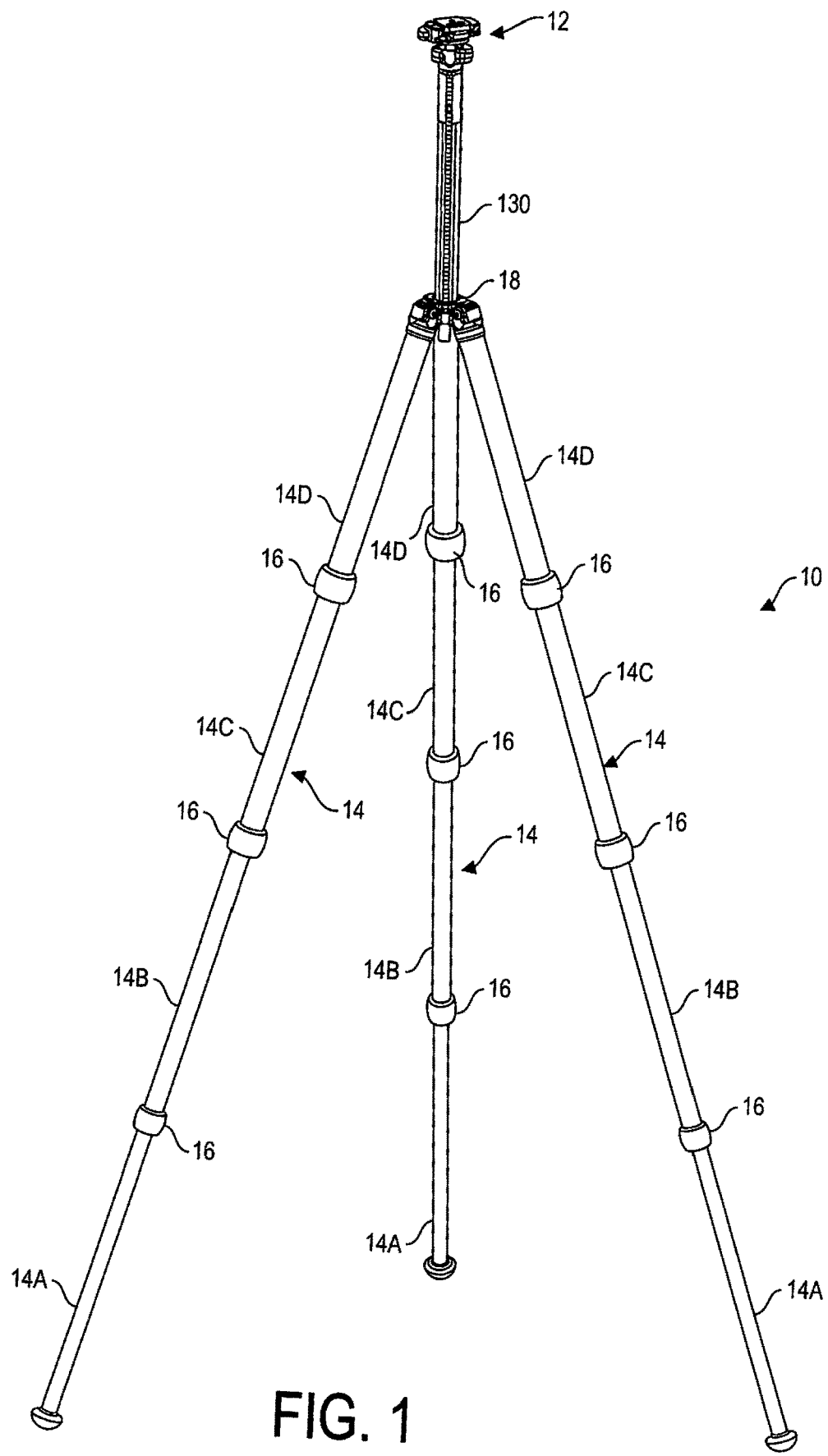
FIG. 1 illustrates an exemplary tripod.

FIG. 1 shows an exemplary tripod 10. Though features are discussed in reference to the depicted tripod, it should be understood that the features may be implemented in an equipment support having any number of legs (or leg). The tripod 10 may include a platform 12 for detachably securing equipment to the tripod 10 using a set screw or other attachment mechanism. The tripod 10 may include a plurality of legs 14 to support the platform 12 at an elevated position. The platform 12 may be detachably mounted within an apex 18 of the tripod, which may be a ring into which the platform 12 may be secured. Each of the legs 14 may include a plurality of telescoping leg sections 14A, 14B, 14C and 14D, that nest together in a retracted position by releasing an appropriate locking mechanism 16. The platform 12 may be supported by a vertically-extensible column movably (e.g., slidably) engaged with the apex 18. The platform 12 may include a spirit level. Each of the legs 14 preferably pivots about a respective axis proximate the apex 18. Through a selective choice of respective angles between each of the legs 14 and the apex 18, along with a desired telescoped length of each respective leg, equipment attached to the tripod 10 may be supported on a wide variety of terrain.

Figure 2:
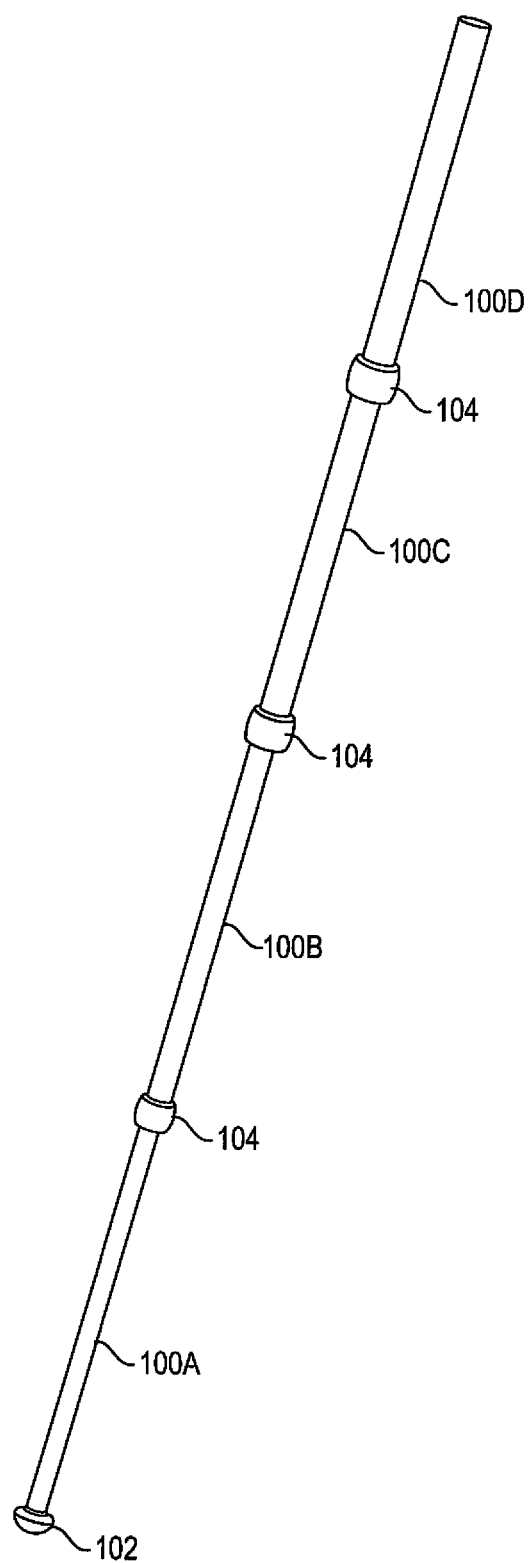
FIG. 2 illustrates a tripod leg with multiple sections for the tripod.

FIG. 2 illustrates an exemplary tripod leg with four leg sections 100A, 100B, 100C, 100D that nest together with one another. Each of the four leg sections 100A, 100B, 100C, 100D are preferably centrally axially aligned with one another. The end of leg section 100A may include a foot 102, having any suitable structure, such as a crenated foot, a spike, or a rounded end. The four leg sections 100A, 100B, 100C, 100D are adjustably slidably secured together by a set of locking mechanisms 104. By rotation of the respective locking mechanism 104 in a first direction, the leg sections 100A, 100B, 100C, 100D may be readily slid with respect to one another. By rotation of the locking mechanism 104 in a second direction, opposite the first direction, the leg sections 100A, 100B, 100C, 100D are selectively inhibited from being readily slid with respect to one another. The end of leg section 100D may include an assembly that is movably attached to an apex assembly, described later. Other locking mechanisms may likewise be used, if desired.

Figure 3:
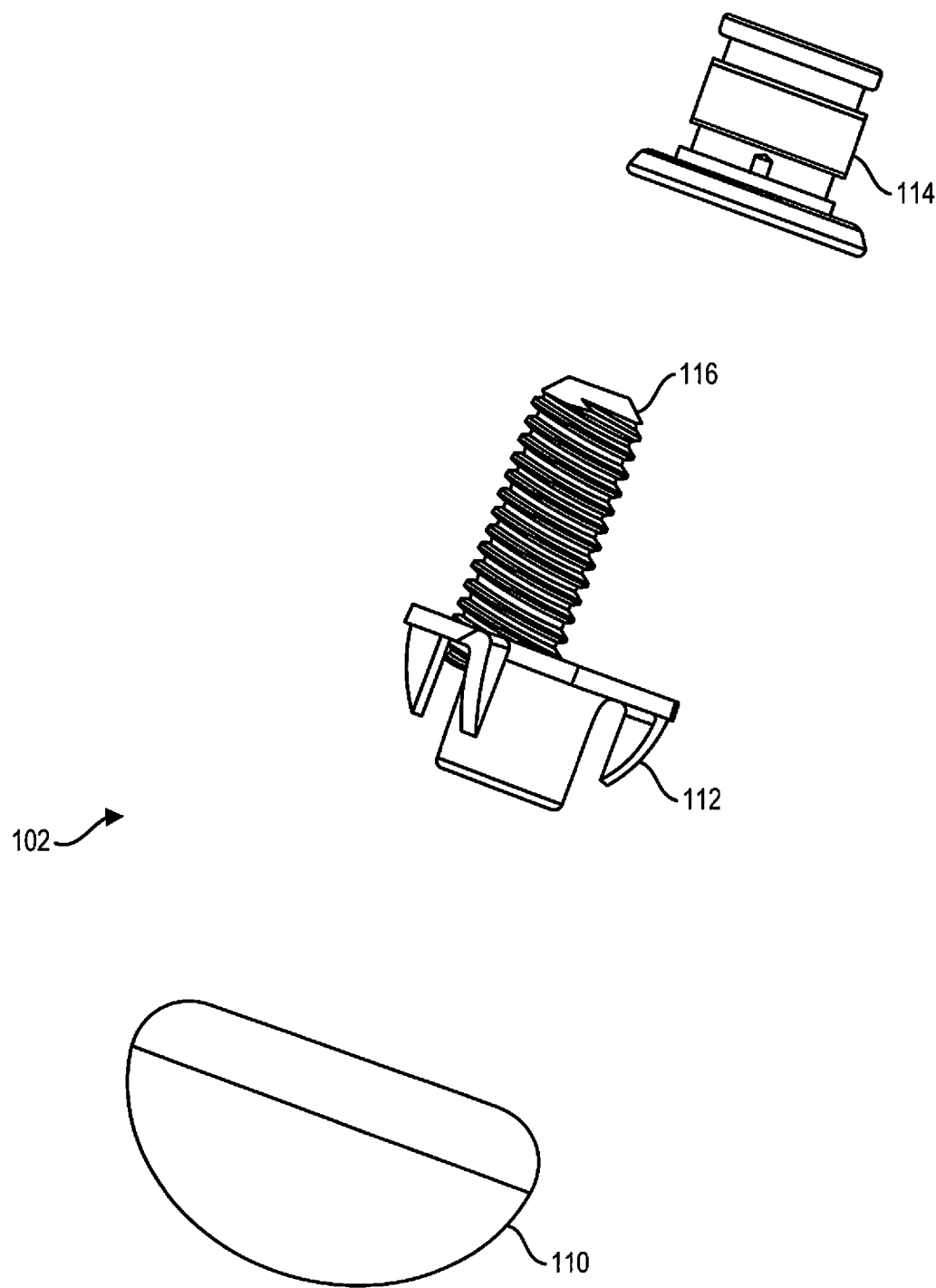
FIG. 3 illustrates a foot assembly for the tripod.

Referring to FIG. 3, an exemplary foot 102 may include a bowl foot 110. The bowl foot 110 preferably has a bowl shaped exterior surface, but may include any other type of shape, such as a spike or a ring. The foot 102 may include a tee nut with 4 prongs 112, which may be detachably engaged with the bowl foot 110. The tee nut 112 may be detachably engaged with a tripod foot receiver 114 using a set screw 116, which may be threadably engaged with threads in the foot 102 using the set screw 116, passing through the tee nut 112. The leg segment 100A may be engaged with a tripod foot receiver 114 with the lower portion thereof of the leg segment 100A in face-to-face engagement with the external surface of the tripod foot receiver 114. It is noted that the foot 102 together with the leg segment 100A forms a structure that is preferably completely sealed which prohibits fluids to enter or to exit the lower portion of the tripod leg.

A tripod often includes a hollow cylindrical center column that may be selectively raised and lowered in some manner to correspondingly raise and lower an imaging device (or other device) supported thereon, and secured at a desired elevation. The hollow cylindrical center column tends to include relatively thick wall together with a relatively large diameter to support a desired weight of the imaging device. A relatively thick wall for the cylindrical center column tends to result in increased weight and expense of the tripod. A relatively large diameter for the cylindrical center column requires a correspondingly large apex resulting in increased weight, increased overall size, and increased expense of the tripod.

Figure 4:
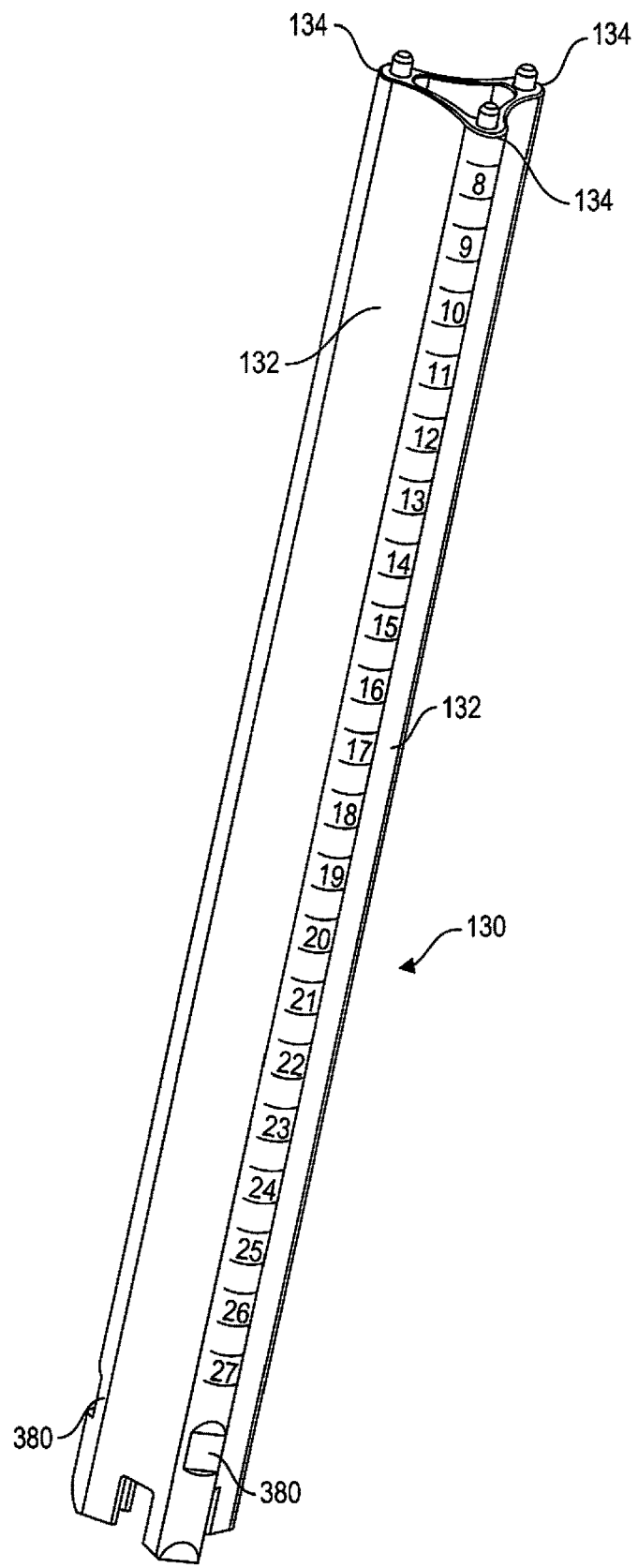
FIG. 4 illustrates a center column for the tripod.
Figure 5:
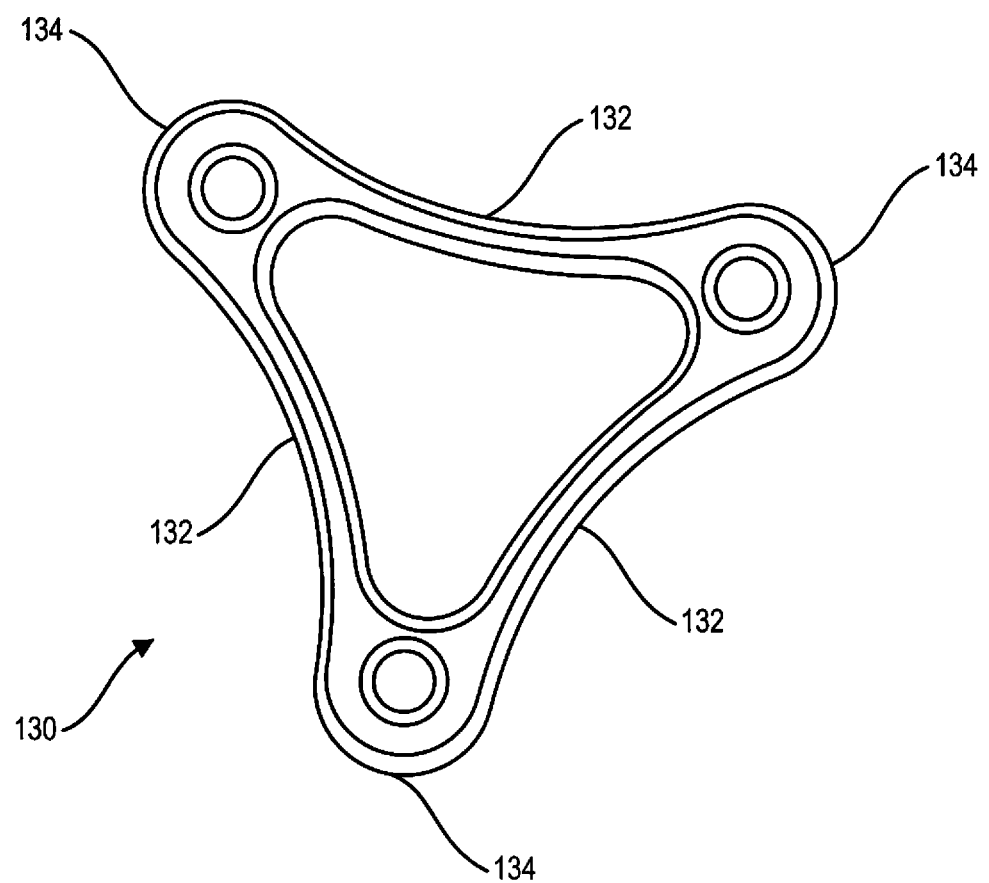
FIG. 5 illustrates a top view of the center column for the tripod.

Referring to FIG. 4 and FIG. 5, a center column 130 for the tripod may include one or more concave faces 132. The concave faces 132 for the center column 130 facilitate the use of a relatively thin wall for the center column 130, together with a relatively small diameter (e.g., defined by a circle around the periphery of the center column) for the center column 130, while being suitable to support a desired weight of an imaging device, which decreases the overall weight of the center column 130. Moreover, the center column 130 having one or more concave faces 132 facilitates a stiffer center column 130 for a given diameter. Also, a relatively small diameter for the center column having one or more concave faces requires a correspondingly smaller apex resulting in decreased weight, decreased overall size, and decreased expense of the tripod.

Figure 6:
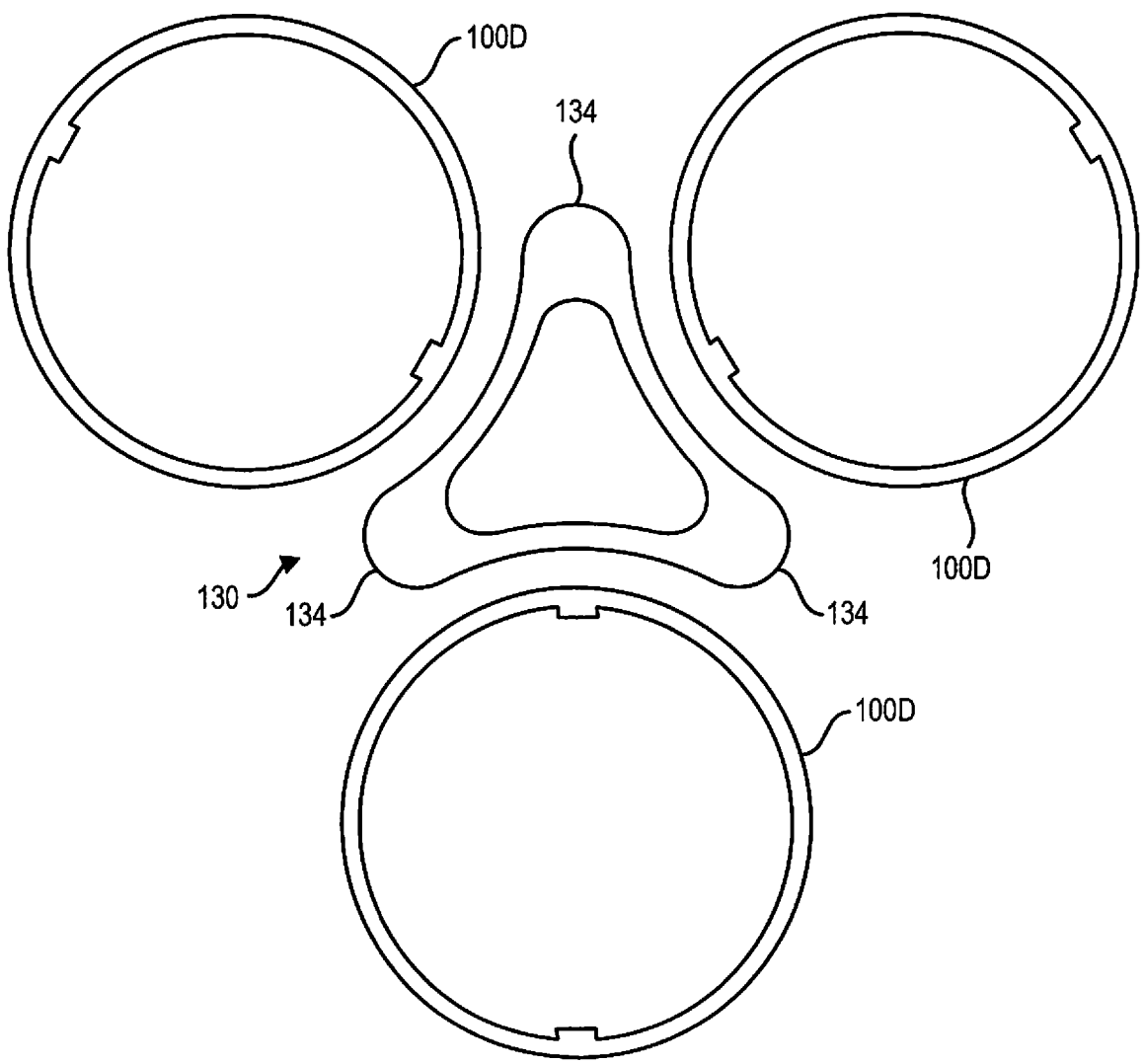
FIG. 6 illustrates a top view of the center column and three tripod legs for the tripod.

Referring also to FIG. 6, preferably, the center column 130 includes a tri-lobe 134 cross-section. The arch of each of the concave faces 132 are preferably arranged and sized to be substantially concentric with the external surface of the upper leg sections 100D. Also, the arch of each of the concave faces 132 may be arranged and sized to be non-substantially concentric with the external surface of the upper leg sections 100D. Also, one or more of the leg sections may have other cross-sectional shapes, such as triangular, octagonal, or ellipsoidal.

Figure 7:
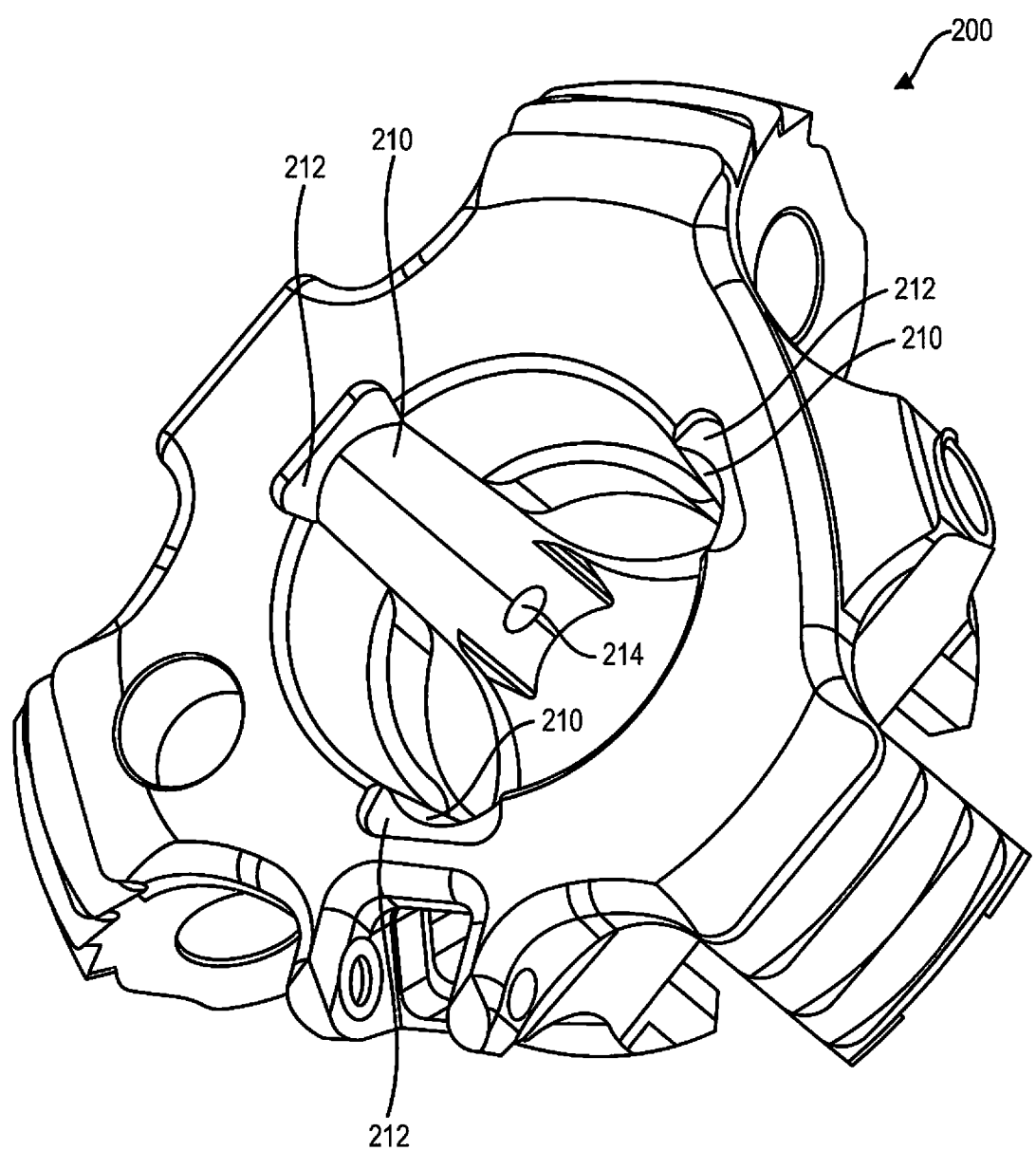
FIG. 7 illustrates a view of an apex for the tripod.
Figure 8:
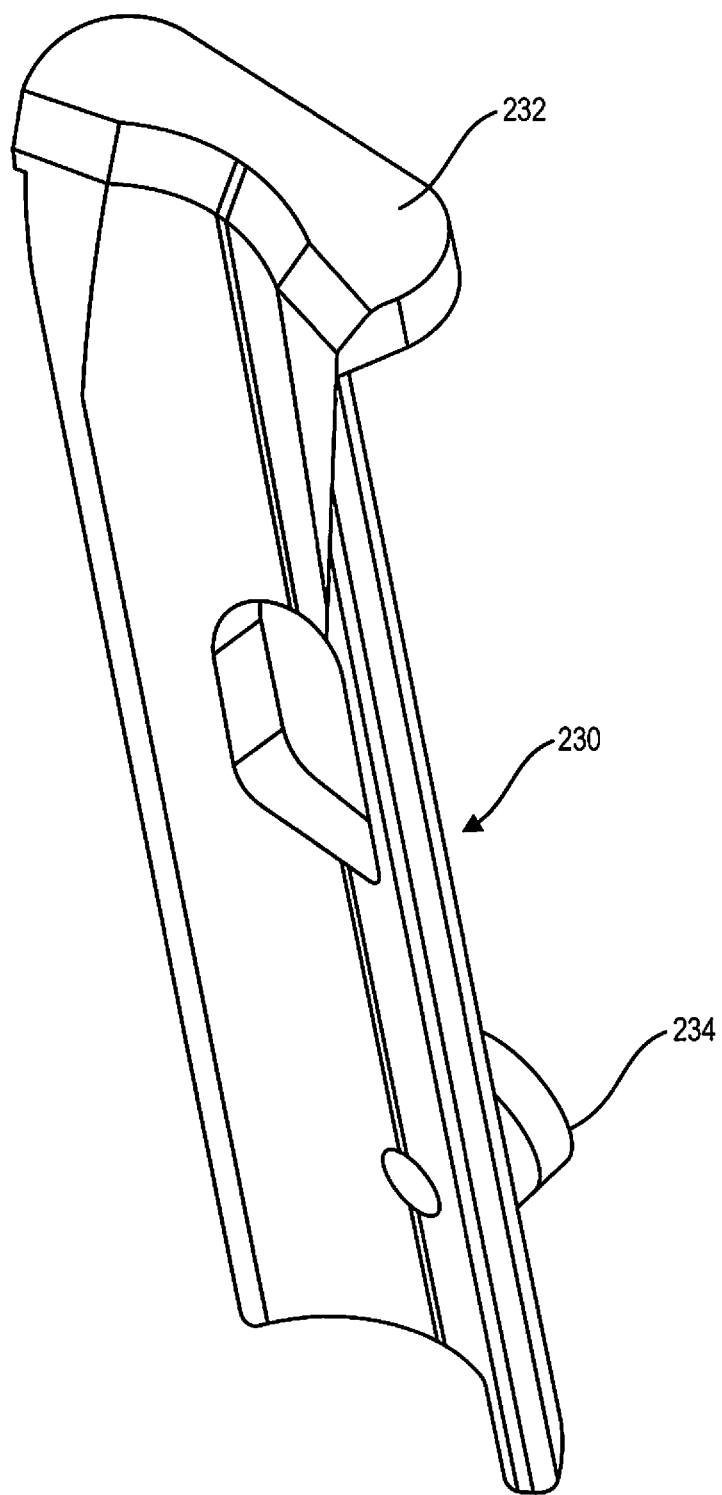
FIG. 8 illustrates a plastic sleeve for the apex.
Figure 9:
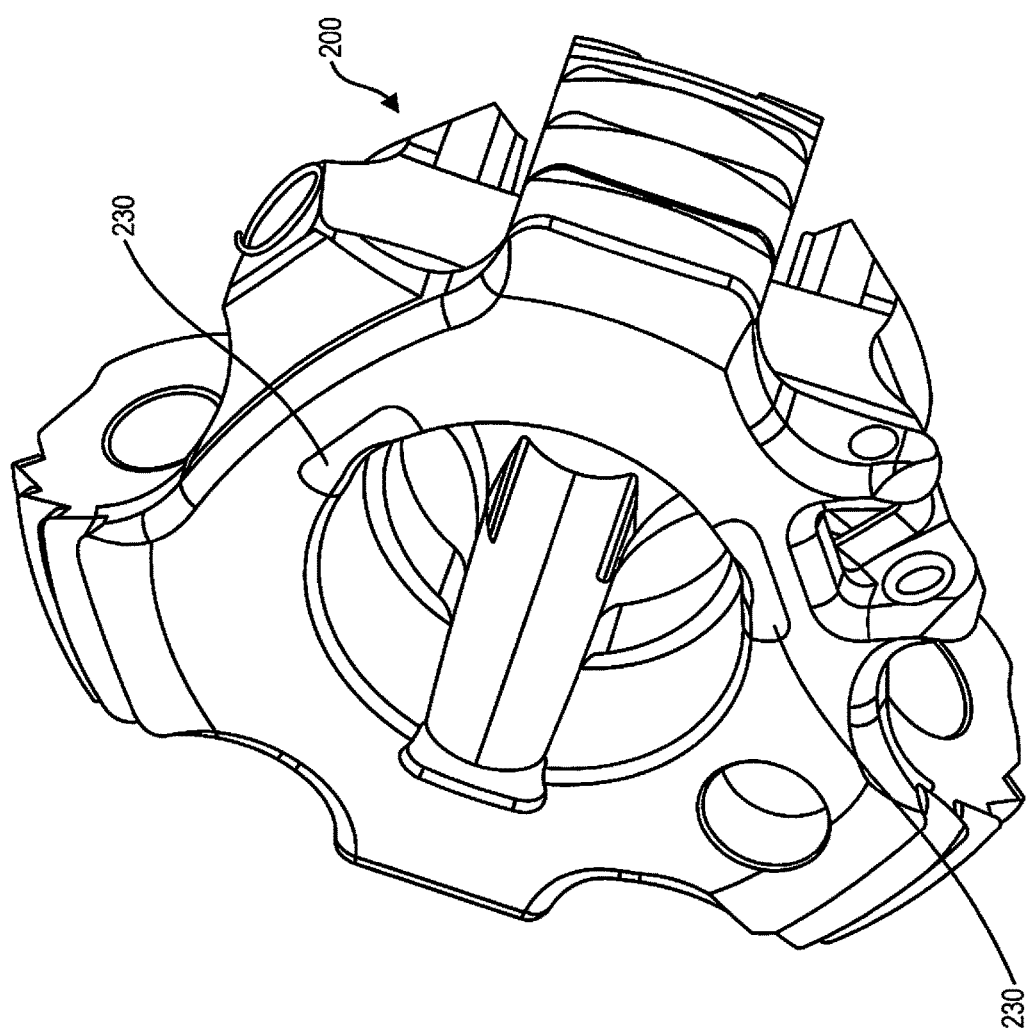
FIG. 9 illustrates the apex with two plastic sleeves attached thereto.

Referring to FIG. 7, an apex 200 is configured to detachably secure the center column 130 and the legs to one another. The apex 200 may define a plurality of curved recesses 210 suitable to detachably engage respective ones of a plurality of resilient plastic sleeves 230 (see FIG. 8). The sleeves may include any suitable shape and be constructed of any suitable material, as desired. The sleeves may be omitted, if desired. Each of the curved recesses 210 define a respective upper lip 212 suitable to engage a respective upper lip 232 of the plastic sleeve 230. The curved recesses 210 define a respective opening 214 suitable to engage a respective protrusion 234 of the plastic sleeve 230. Referring to FIG. 9, each of the plastic sleeves 230 may be engaged with the interior of the apex 200, and thereby be maintained from freely moving in a vertical direction by a combination of the upper lip 232/upper lip 212 and the protrusion 234/opening 214. When the plastic sleeves 230 are engaged with the apex 200, the resulting interior surfaces are preferably substantially coplanar with one another. In another embodiment, the retention technique for the plastic sleeves 230 may include a rib on the respective sleeve with a respective hole defined therein. A respective pin is pressed through corresponding holes on the apex to securely hold the respective sleeves.

Figure 10:
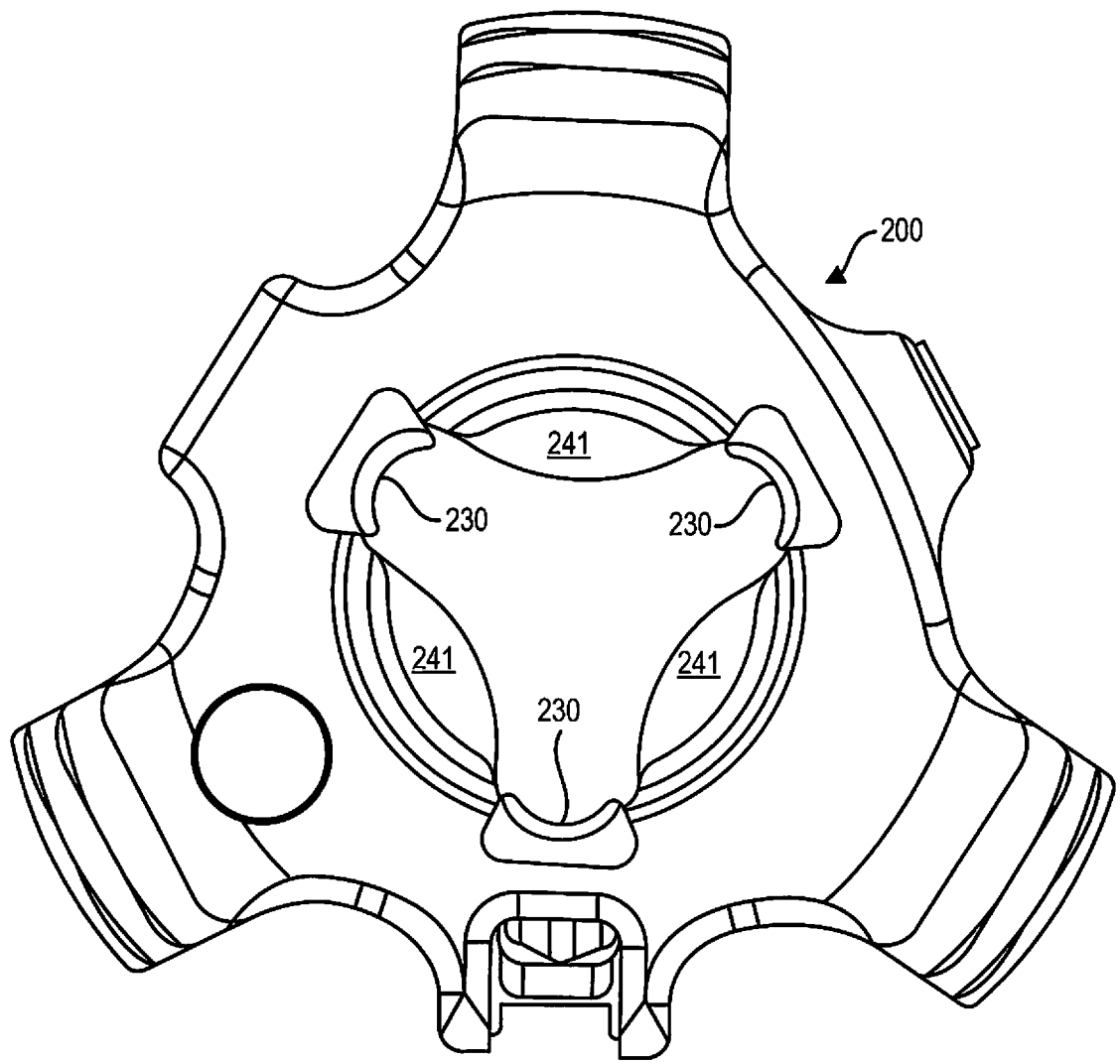
FIG. 10 illustrates the apex with three plastic sleeves attached thereto.

Referring to FIG. 10, the arrangement of the plastic sleeves 230 around the apex 200 is located consistent with that of the lobes 134. Also, the apex 200 may define a set of one or more flanges 241 with curved arches that are substantially matching the convex surfaces of the center column 130. The curved arches assist in maintaining the rotational alignment of the center column 130 and inhibit debris from entering the apex which would inhibit the movement and selective restraining of the center column 130. In addition, the curved arches of the flanges 241 are also where the safety stop lobes contact with the apex when engaged (described in more detail below).

Figure 11:
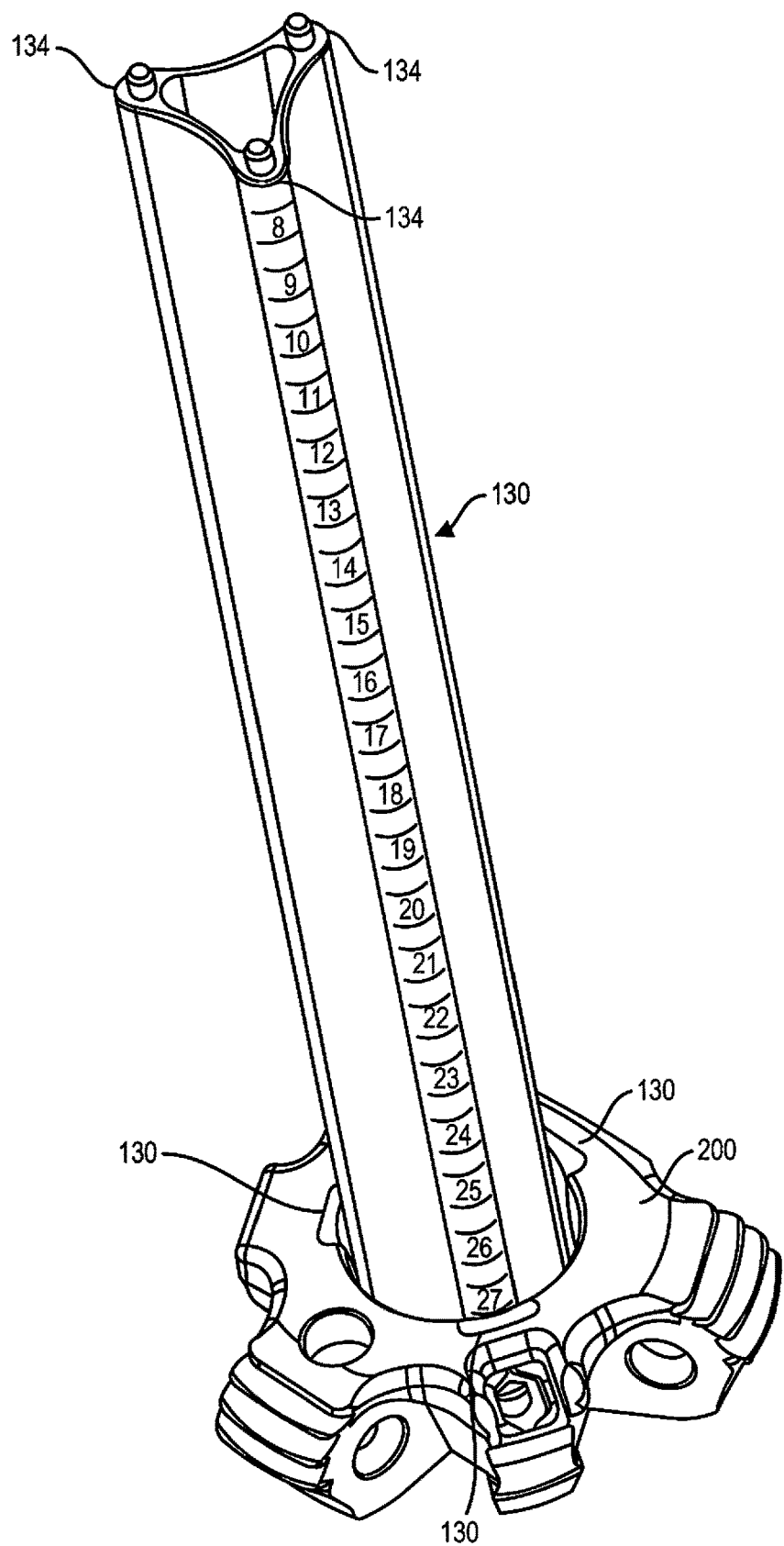
FIG. 11 illustrates the apex and the center column.

Referring also to FIG. 11, the center column 130 may be engaged with the apex 200 in such a manner that the lobes 134 are in close proximity to the plastic sleeves 130. The apex 200 may include an apex locking mechanism 250 (see FIG. 13) that selectively inhibits movement of the center column 130 with respect to the apex. The plastic sleeves 230 provide an interface with reduced friction between the center column 130 and the apex 200, in such a manner that the center column may selectively substantially freely move in an upward and a downward direction and selectively be substantially inhibited from freely moving in the upward and the downward direction.

Figure 12:
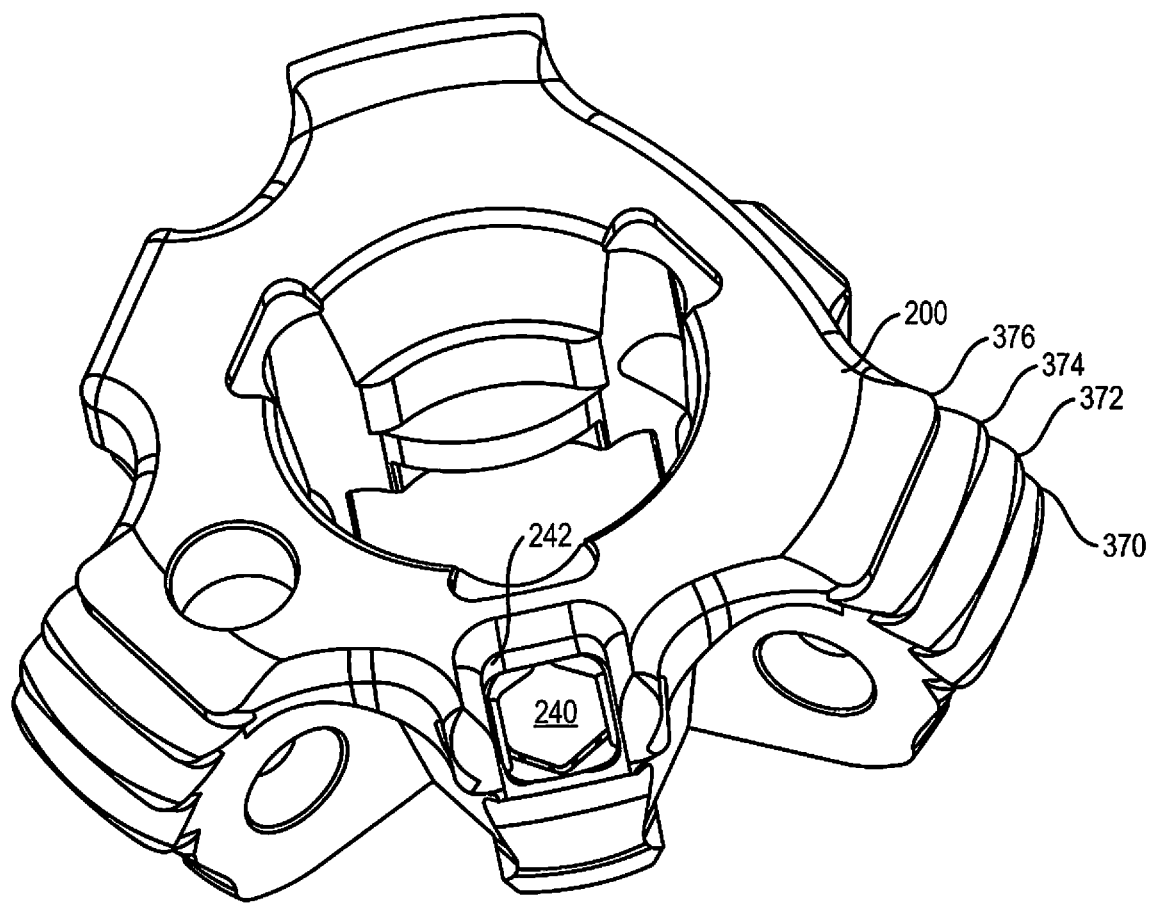
FIG. 12 illustrates the apex defining an opening for a locking assembly.
Figure 13:
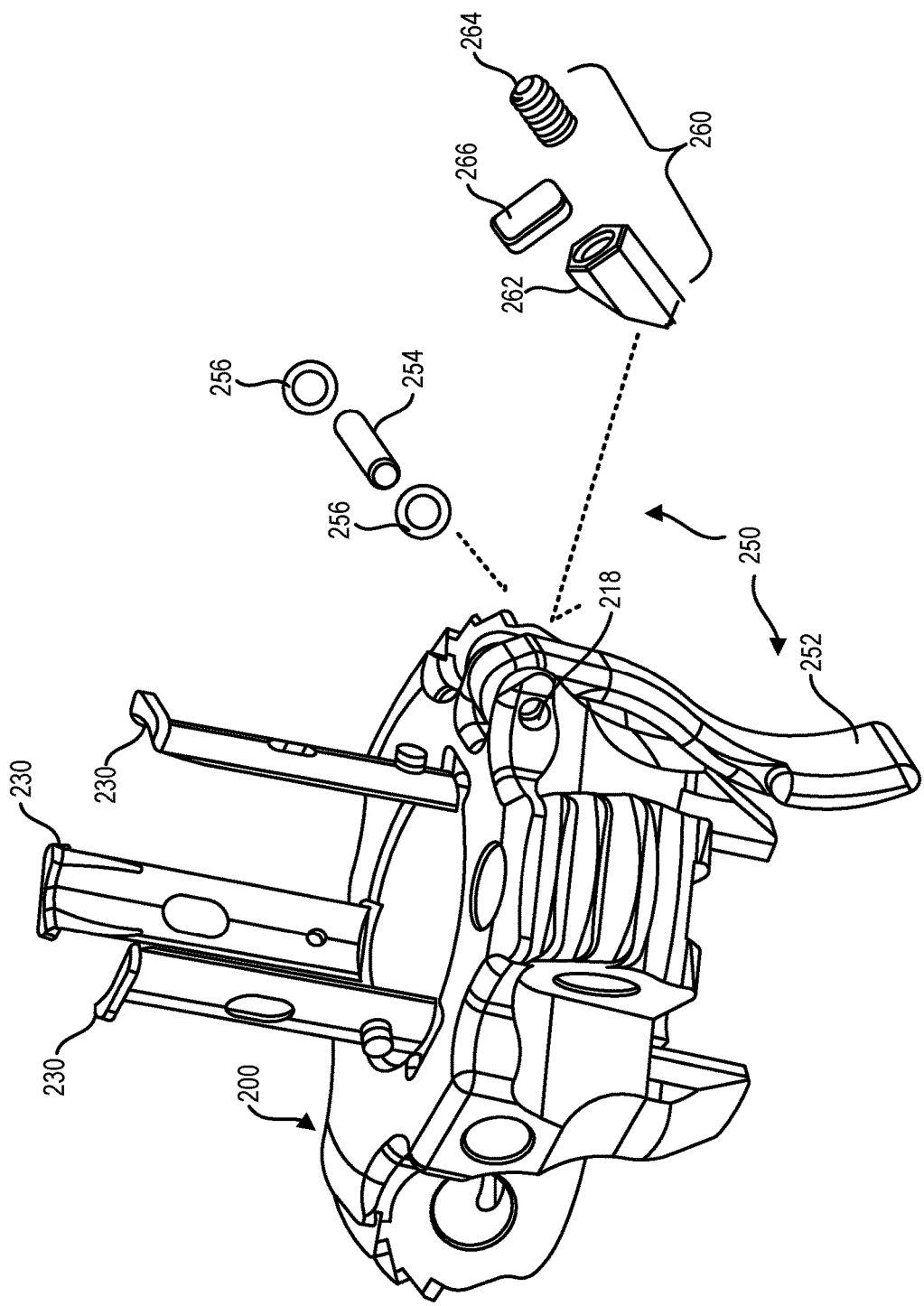
FIG. 13 illustrates the apex and the locking assembly.
Figure 14:
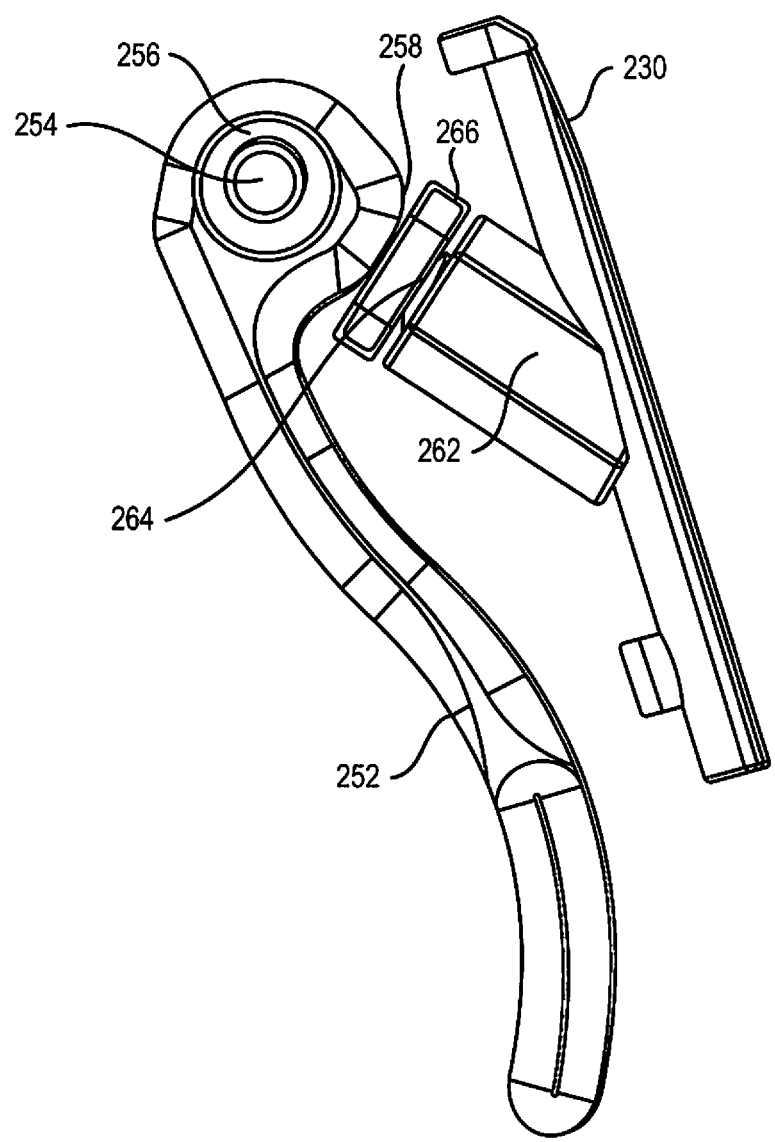
FIG. 14 illustrates a plunger assembly for the locking assembly.

Referring also to FIG. 12 and FIG. 13 and FIG. 14, the apex 200 may define an opening 240 therein that operates in cooperation with the apex locking mechanism 250. The apex locking mechanism 250 may include a lever 252 and a dowel pin 254 that extends through an opening defined by the lever 252 and extends at least partially through a pair of openings 218 defined by the apex 200. A pair of O-rings 256 may extend over the respective ends of the dowel pin 254 and restrain the dowel pin 254 within the openings 218 as well as provide a dampened feel to the lever rotation while holding the lever in place so that it doesn't fall under its own weight. The lever 252 rotatably rotates up and down around the dowel pin 254. The lever 252 may include non-circular cross-sectional shape with a protruding portion 258.

Figure 43:
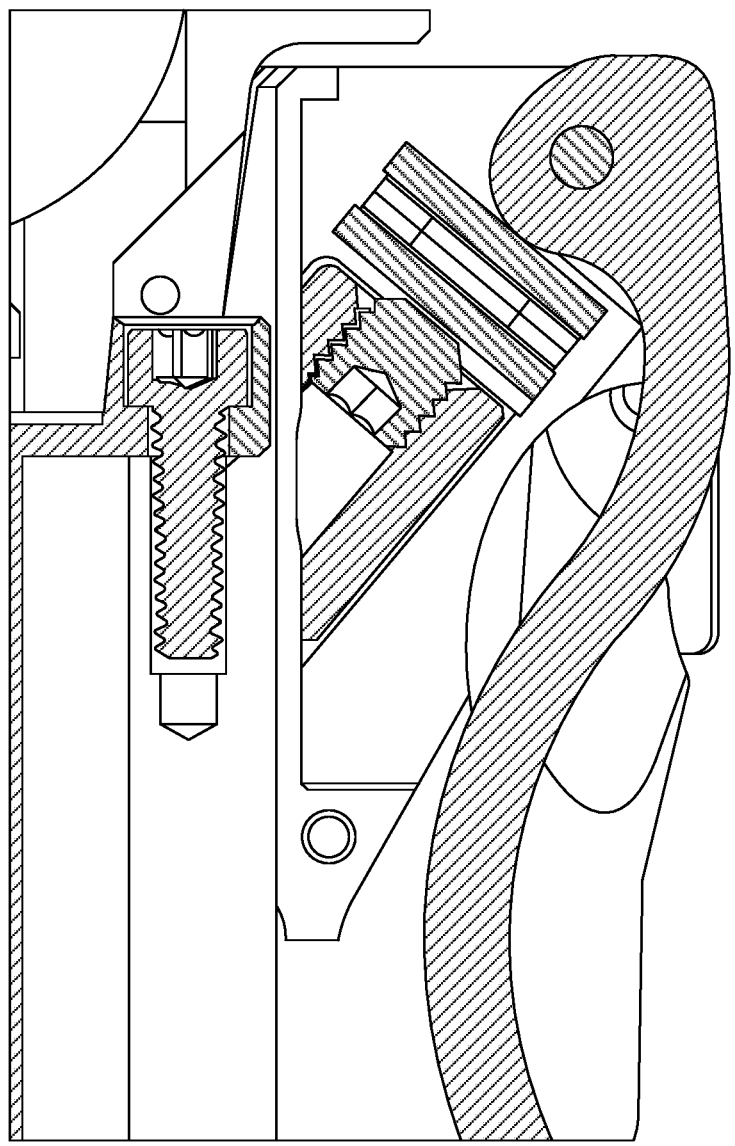
FIG. 43 illustrates another embodiment of a plunger assembly.

Referring to FIG. 12 and FIG. 13 and FIG. 14, a plunger assembly 260 may include a center column caliper 262, a column set screw 264, and a lever wear plate 266. Referring to FIG. 43, in another embodiment, a cam shaped lever may be used to push on a stack (one or more) of wear plates used in combination with a pair of Belleville disc springs (one or more) together with a caliper to provide for additional compliance. In the embodiment shown in FIG. 43, the springs allow for some variance in column size, maintains a relatively consistent locking force on the column, and may be timed to the desired locking force by rotating an internal set screw which is accessed below the apex when the column is removed. Referring again to FIG. 12 and FIG. 13 and FIG. 14, the lever wear plate 266 may be maintained in position on the apex 200 by the shape of an opening 242 defined around an upper portion of the opening 240. The lever wear plate may include other shapes, such as circular. The length of the plunger assembly 260 may be modified by rotation of the column set screw 264. The plunger assembly 260 is positioned within the opening 240 and maintained in position between the lever 252 and the respective plastic sleeve 230. With the lever 252 in an upward position, the lever 252 exerts limited, if any, pressure on the lever wear plate 266 which in turns exerts limited, if any, pressure on the plastic sleeve 230. With the lever 252 in a downward position, the lever 252 exerts substantial pressure on the lever wear plate 266 which in turns exerts substantial pressure on the plastic sleeve 230. With the center column 130 engaged with the apex 200, the movement of the lever 252 selectively inhibits movement of the center column 130 by selectively exerting pressure on the plastic sleeve 230. As it may be observed, the center column 130 may be locked in position using a single apex locking mechanism 250. Further, the single apex locking mechanism 250 with a tri-lobe arrangement provides substantial stability when locked. The locking mechanism may be achieved using other arrangements, as desired. The plastic sleeve(s) may be omitted, if desired.

Figure 15:
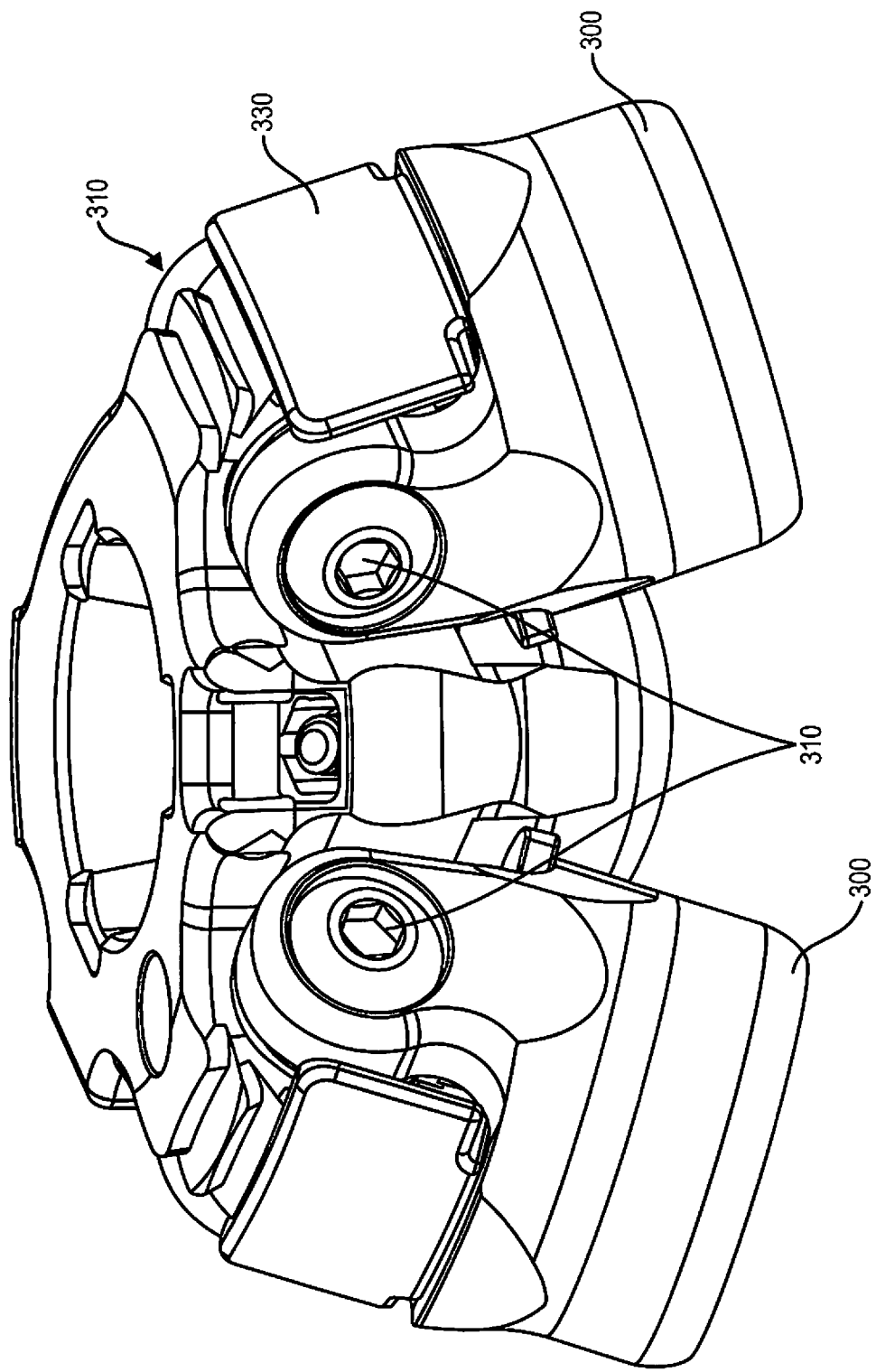
FIG. 15 illustrates an apex assembly for the tripod.
Figure 16:
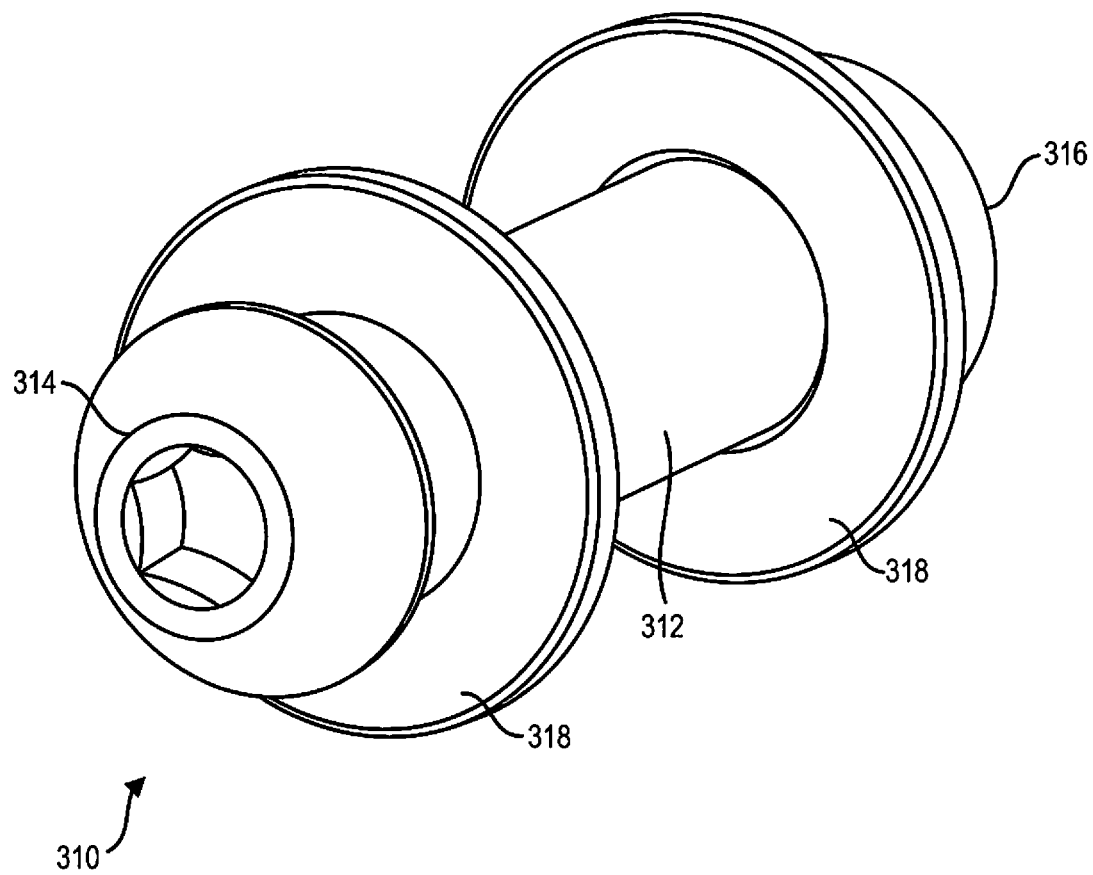
FIG. 16 illustrates an axle assembly for the apex assembly.

Referring to FIG. 15, an apex assembly may include a set of one or more legs rotatably interconnected to the apex 200. The end portion of each of the leg segments 100D may be secured within an end portion of a respective leg coupler 300. Referring also to FIG. 16, the respective leg coupler 300 may be rotatably secured to the apex 200 by an axle assembly 310. The axle assembly 310 may include a cylindrical yoke axle 312, a screw 314, a screw 316 rotatably interconnected to the screw 314, and a pair of washers 318. The axle assembly 310 limits the movement of the respective leg along a single arc.

Figure 17:
FIG. 17 illustrates a leg coupler of the apex assembly.
Figure 18:
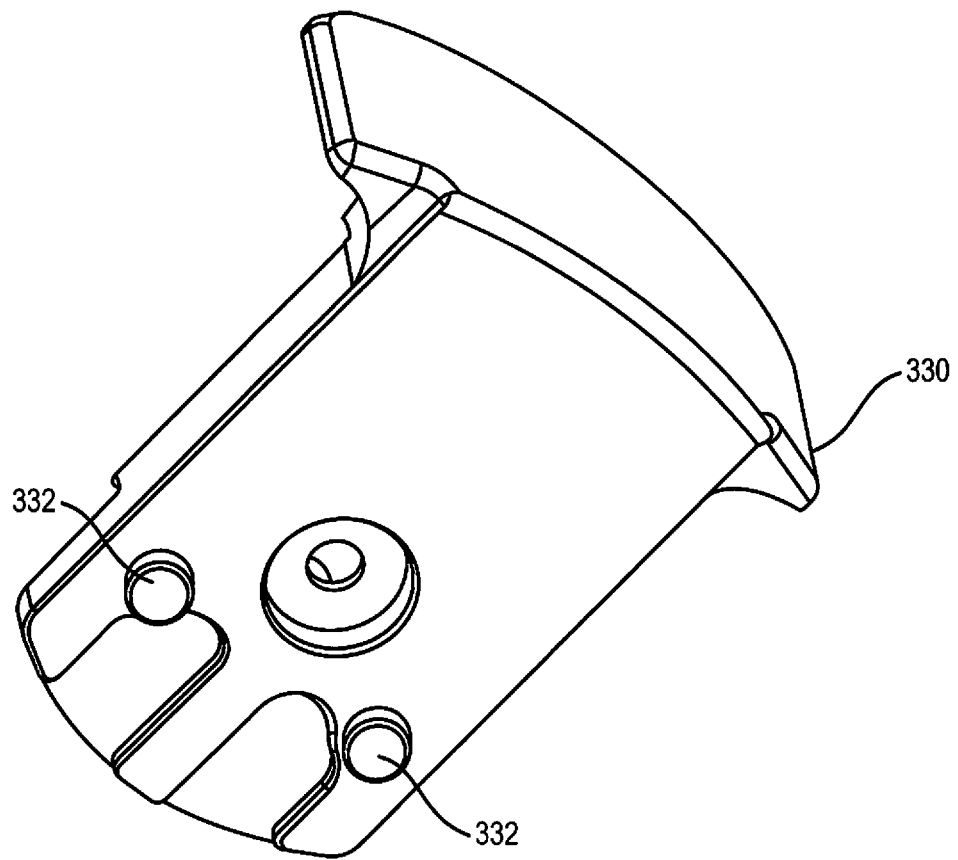
FIG. 18 illustrates a pull tab of the apex assembly.

Referring also to FIG. 17 and FIG. 18, the apex assembly may include a respective pull tab 330 that is engaged with the respective leg coupler 300. The pull tab 330 may include one or more protrusions 332 that matingly engage with one or more openings 334 defined by the leg coupler 300. The protrusions 332 and openings 334 define a limited range of movement of the pull tab 330 with respect to the leg coupler 300, where the limited range of movement is substantially limited to a single axial direction.

Figure 19:
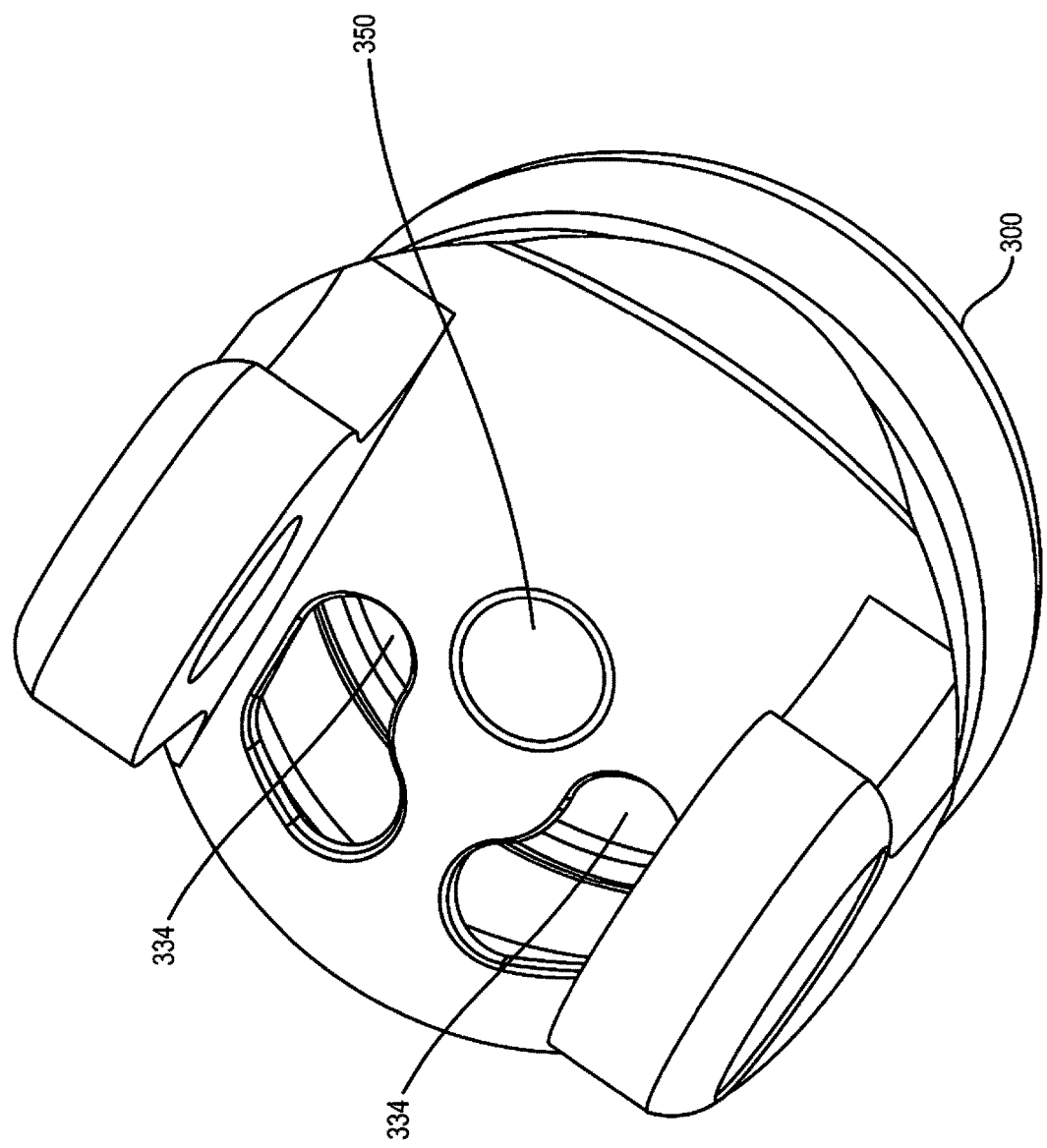
FIG. 19 illustrates the leg coupler together with a magnet of the apex assembly.
Figure 20:
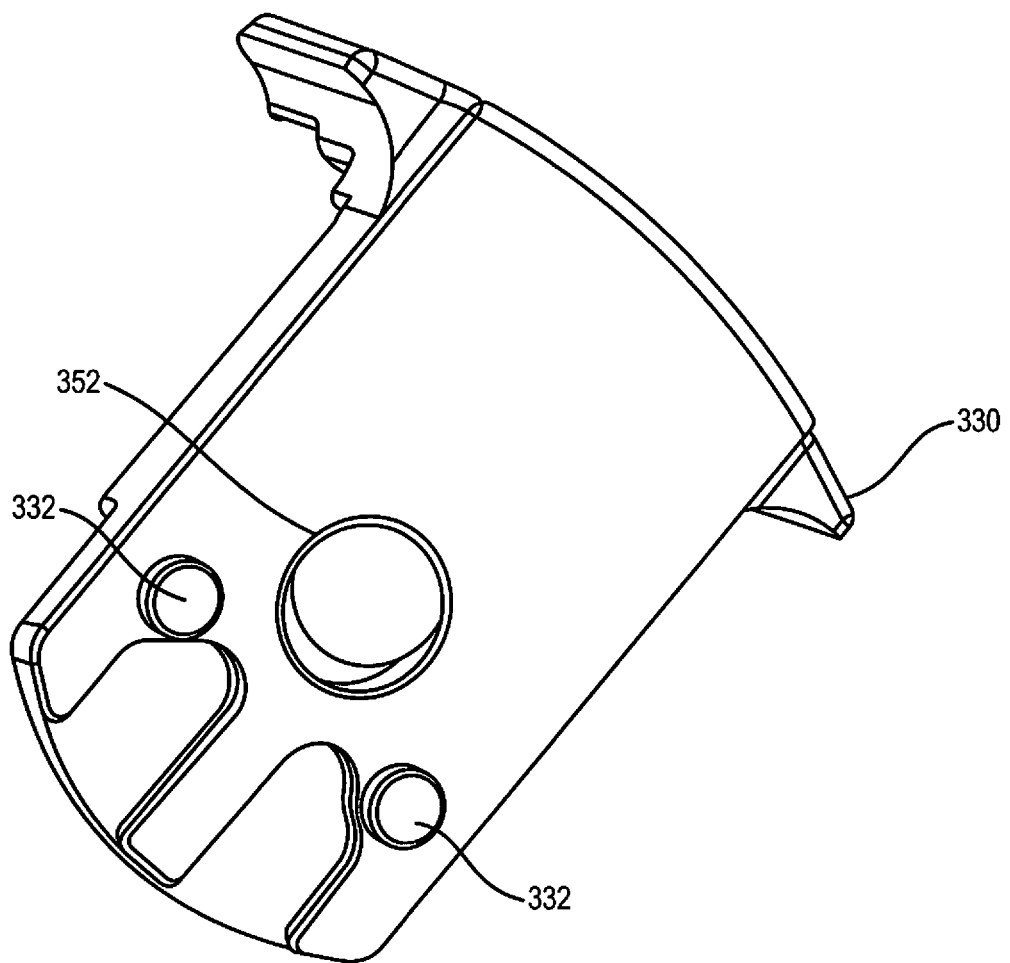
FIG. 20 illustrates the pull table together with a magnet of the apex assembly.
Figure 21:
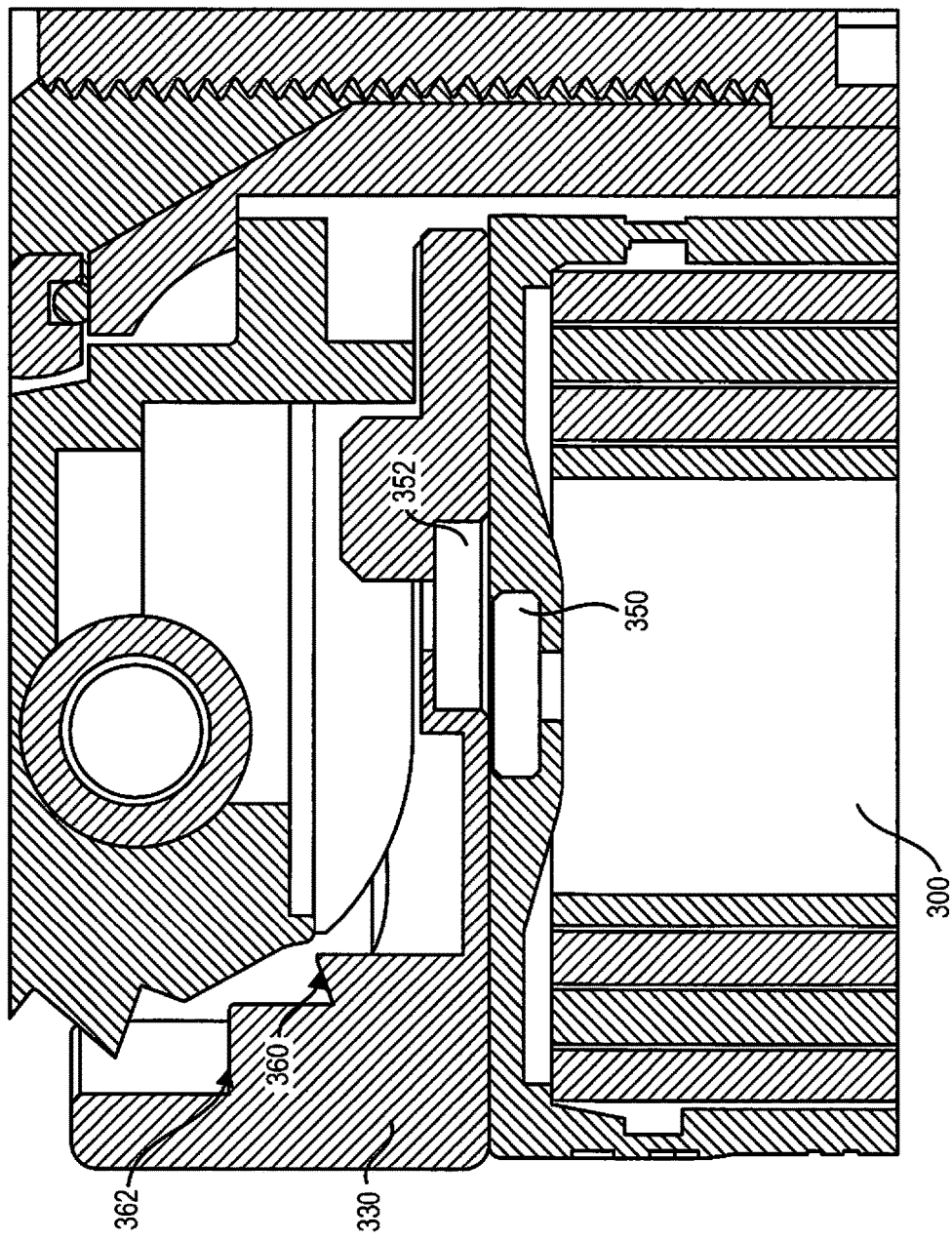
FIG. 21 illustrates the leg coupler and pull tab together with respective magnets of the apex assembly.

Referring to FIG. 19 and FIG. 20, the apex assembly may include the respective pull tab 330 together with a respective magnet 352 that is engaged with the respective leg coupler 300 with a respective magnet 350. The pull tab 330 that includes the magnet 352 is arranged to provide an opposing magnetic field to the leg coupler 300 that includes the magnet 350. Referring also to FIG. 21, the magnets 350, 352 oppose one another and tend to inhibit movements of the magnets 350, 352 with respect to one another to freely pass one another. The use of recessed magnets 350, 352 reduces the space used for the pull tab 330 and tends to increase reliability due to the use of non-moving parts.

Figure 22:
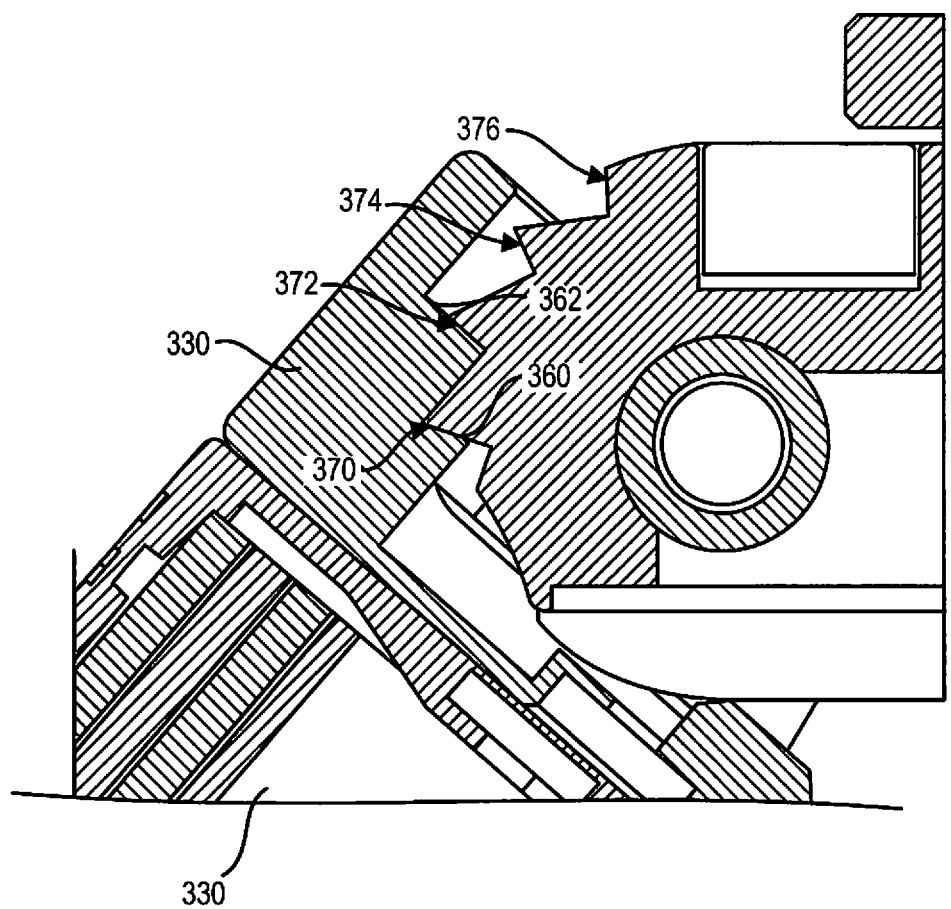
FIG. 22 illustrates the leg coupler and the pull tab.

Referring to FIG. 22, the pull tab 330 preferably includes a plurality of staggered surfaces 360, 362. The apex 200 includes a plurality of staggered teeth 370, 372, 374, 376 (see also FIG. 12). The spacing between the plurality of staggered surfaces 360, 362 is preferably selected to match the spacing between the plurality of staggered teeth 370, 372, 374, 376. The pull tab 330 may be pulled outwardly, the respective leg 100D is adjusted in its angle with respect to the apex 200 to a desired angle, and the pull tab 330 is pushed inwardly. Thereafter, a plurality of the staggered teeth 370, 372, 374, 376 simultaneously engage the staggered surfaces 360, 362, at one of four different positions. The number of staggered teeth may be selected, as desired. The number of staggered surfaces may be selected as desired. The number of opposing surfaces being simultaneously engaged with may be selected, as desired. The use of two or more simultaneous opposing contact surfaces for the engagement of the pull tab with the apex distributes the torque load across a larger radial area, than using a single pair of opposing contact surfaces, which reduces the amount of travel necessary for the pull-tab and allows for a smaller angle interval.

Figure 23:
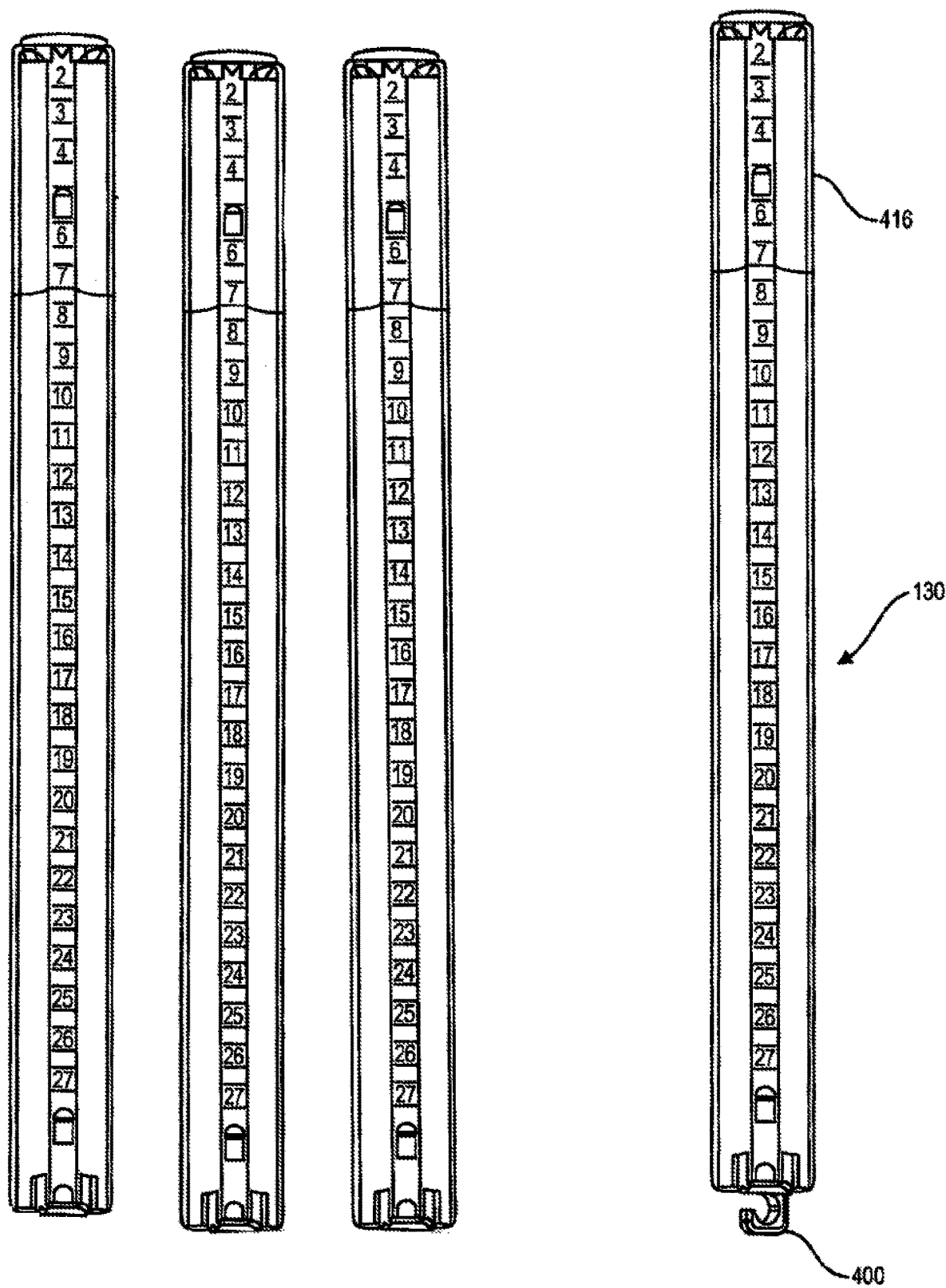
FIG. 23 illustrates the center column with a lower section, an upper section, and a hook.
Figure 24:
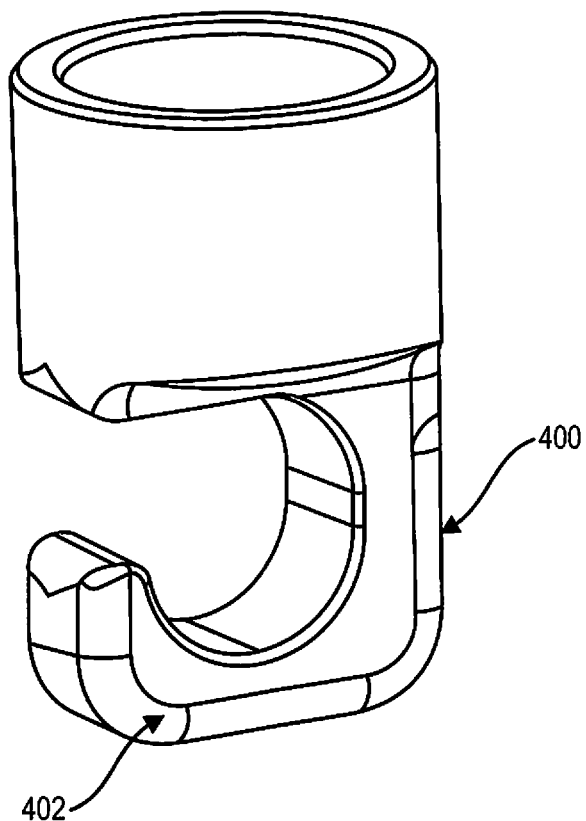
FIG. 24 illustrates the hook.
Figure 25:
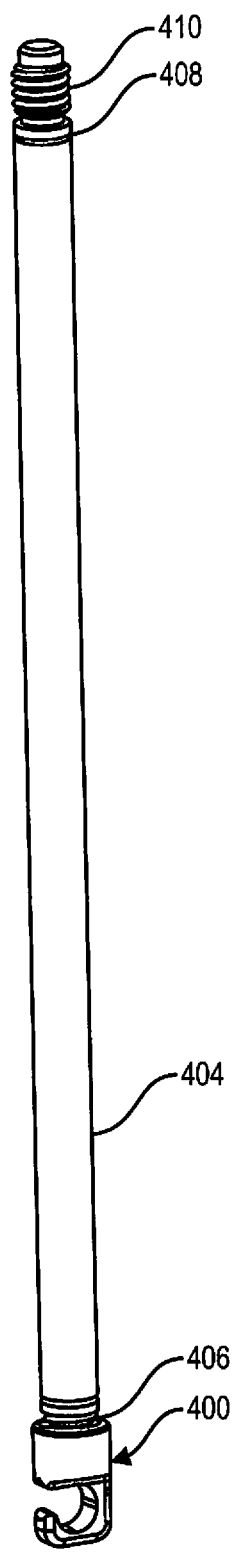
FIG. 25 illustrates a center column attachment rod and the hook.
Figure 26:
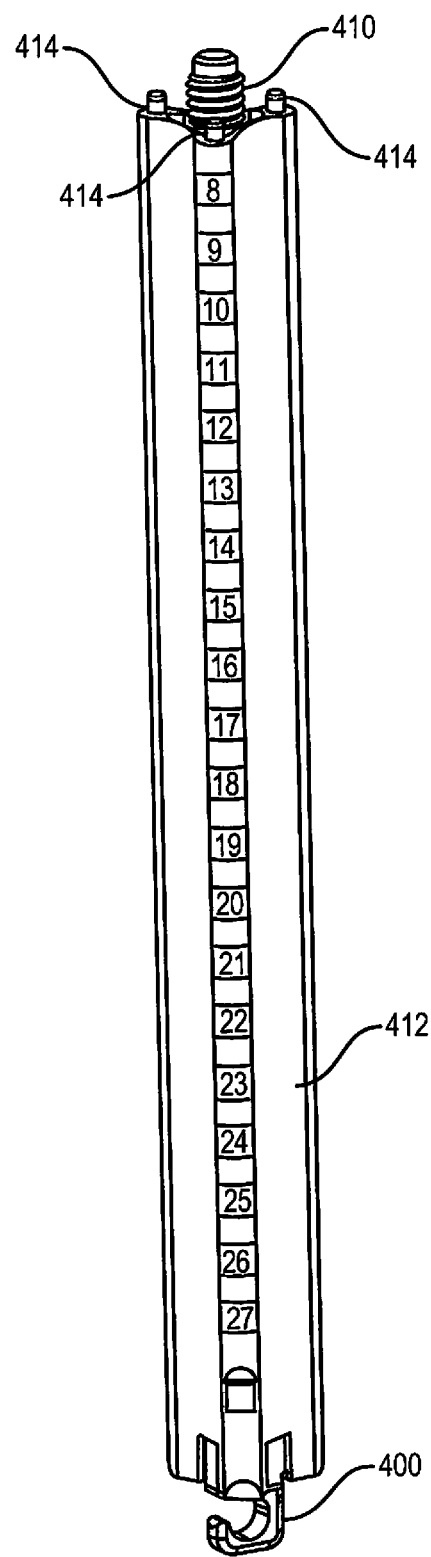
FIG. 26 illustrates the lower section of the center column.
Figure 27:
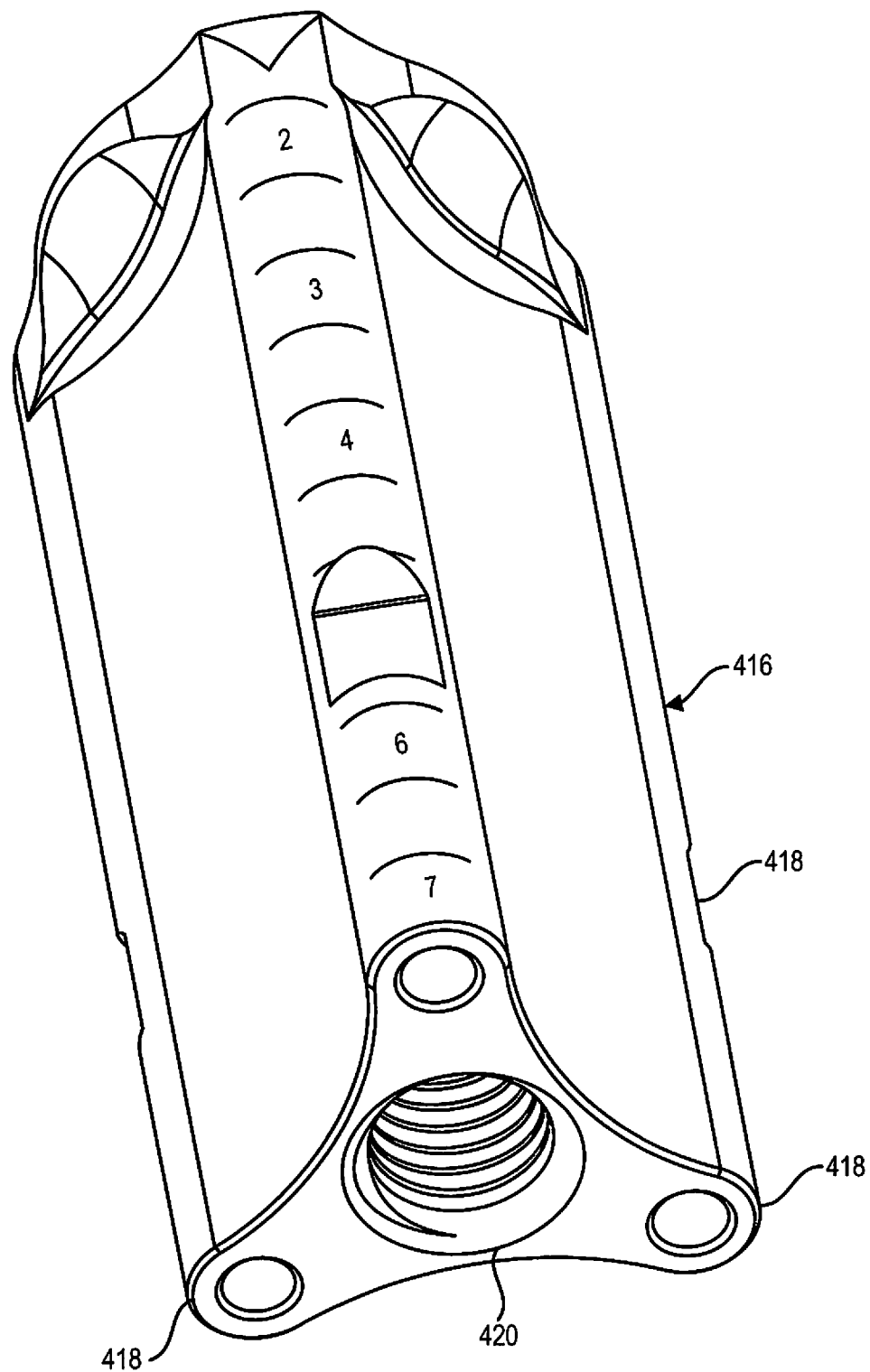
FIG. 27 illustrates the upper section of the center column.

Referring to FIG. 23, the central column 130 may include a bottom hook 400 (see FIG. 24) that defines a hook portion 402. Referring to FIG. 25, the bottom hook 400 may be secured to a center column attachment rod 404 by a set of lower threads 406. In another embodiment, the bottom hook may be secured to a center column attachment rod by a pin (described in more detail below). The upper portion of the center column attachment rod 404 may include an O-ring 408 and a set of upper threads 410. Referring also to FIG. 26, the center column attachment rod 404 may be maintained within a lower section 412 of the central column 130 with the bottom hook 400 maintained within a recess defined by the lower section 412. In another embodiment, bottom hook may be secured to the center column attachment rod by a pin with the recess omitted (described in more detail below). The lower section 412 optionally includes a plurality of spaced apart upper pins 414. Referring to FIG. 27, an upper section 416 of the center column 130 may optionally define a corresponding set of openings 418 matching that of the upper pins 414, and a threaded central opening 420. The upper threads 410 of the center column attachment rod 404 are rotatably engaged with the threaded central opening 420 of the upper section 416, to securely secure the lower section 412 to the upper section 416. In another embodiment, the upper section may be secured to the lower section by a flexure inside the upper section. The plurality of pins 414 maintain the lower section 412 and the upper section 416 from rotating with respect to one another. In another embodiment, the flexure inside the upper section and the lower section maintain the sections from rotating with respect to one another. Also, the lower section 412 and the upper section 416 may be detachably engaged from one another.

Figure 28:
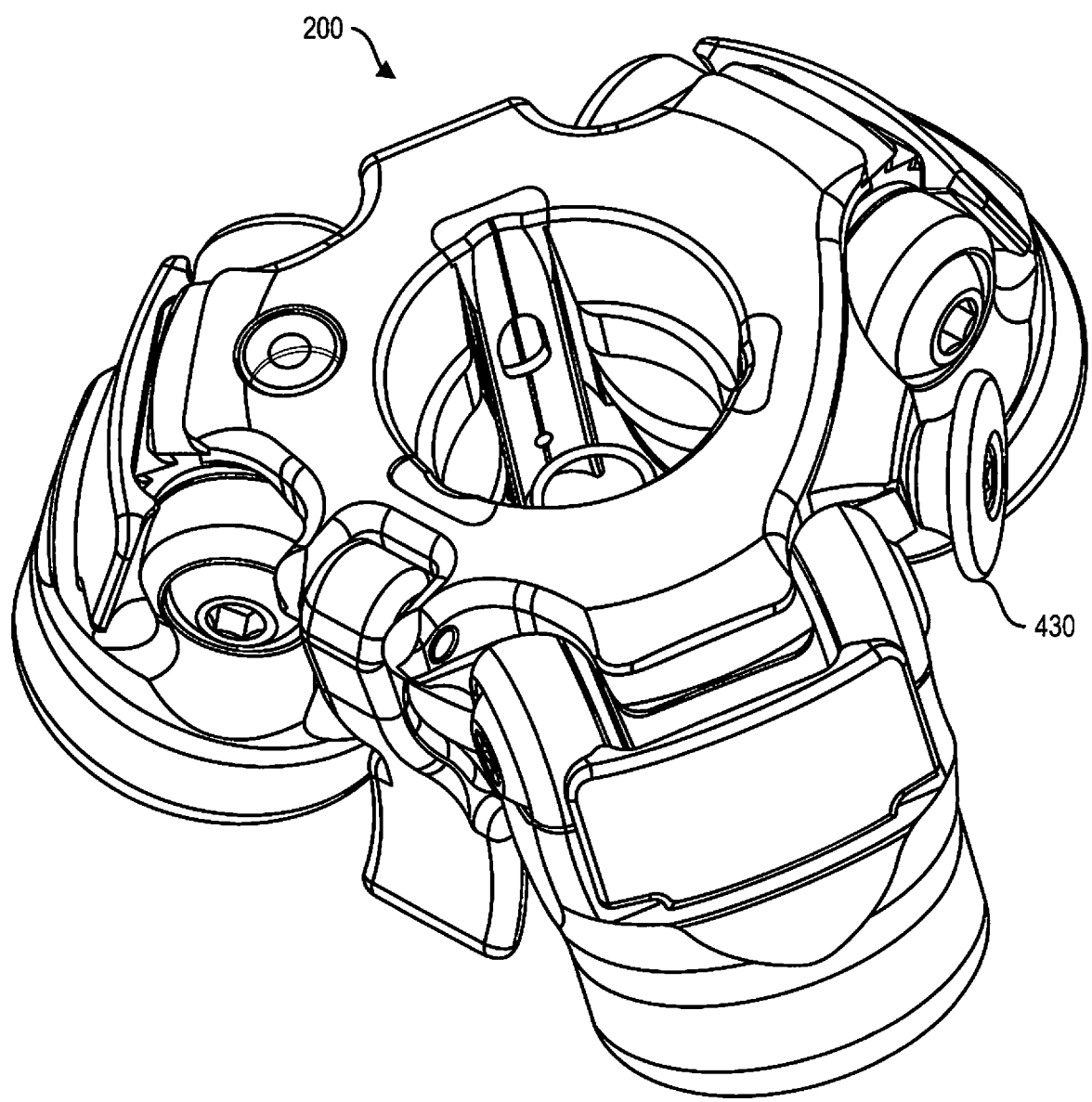
FIG. 28 illustrates the apex with a safety pull knob.
Figure 29:
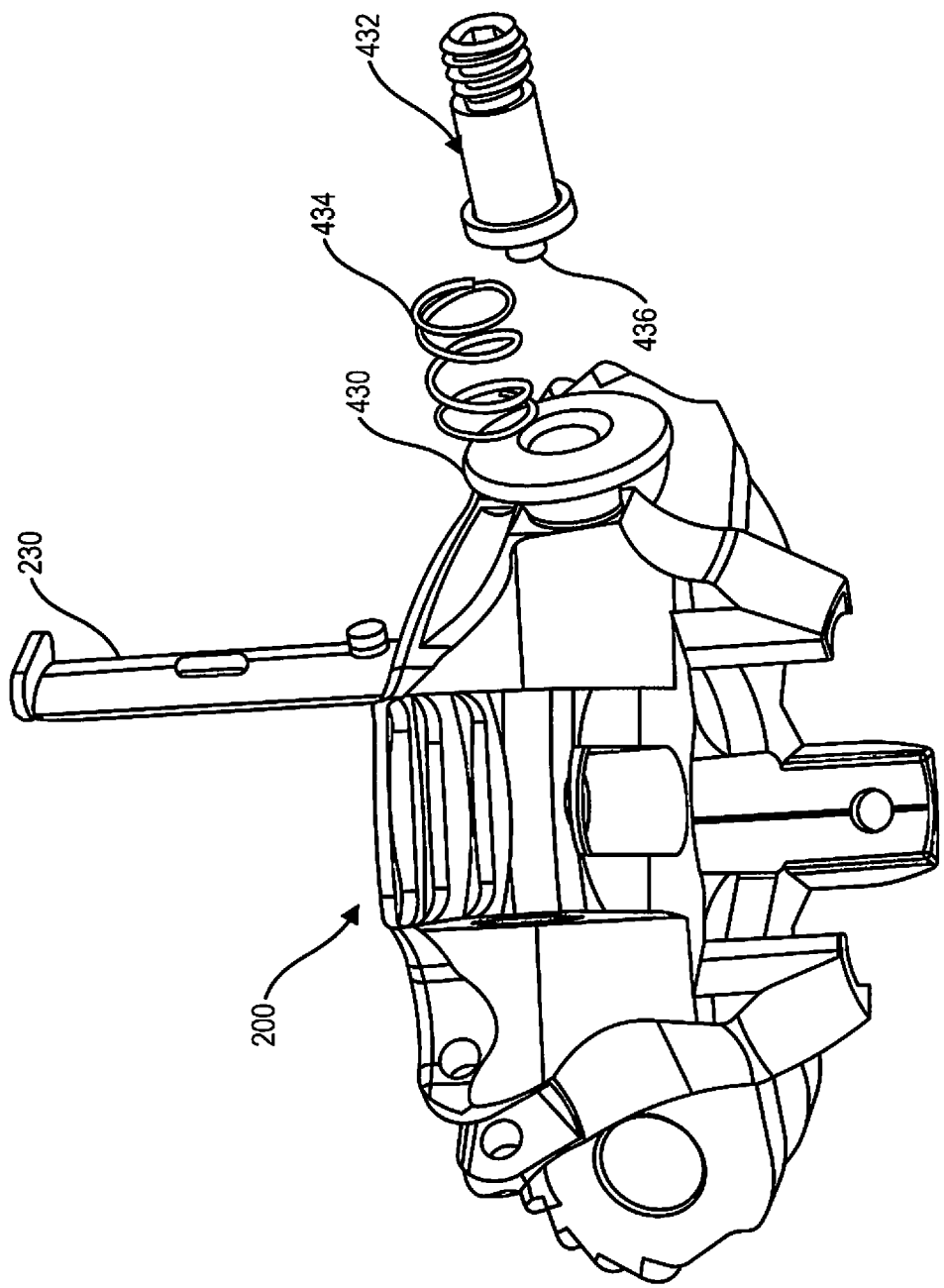
FIG. 29 illustrates the apex with a safety pull knob assembly.
Figure 30:
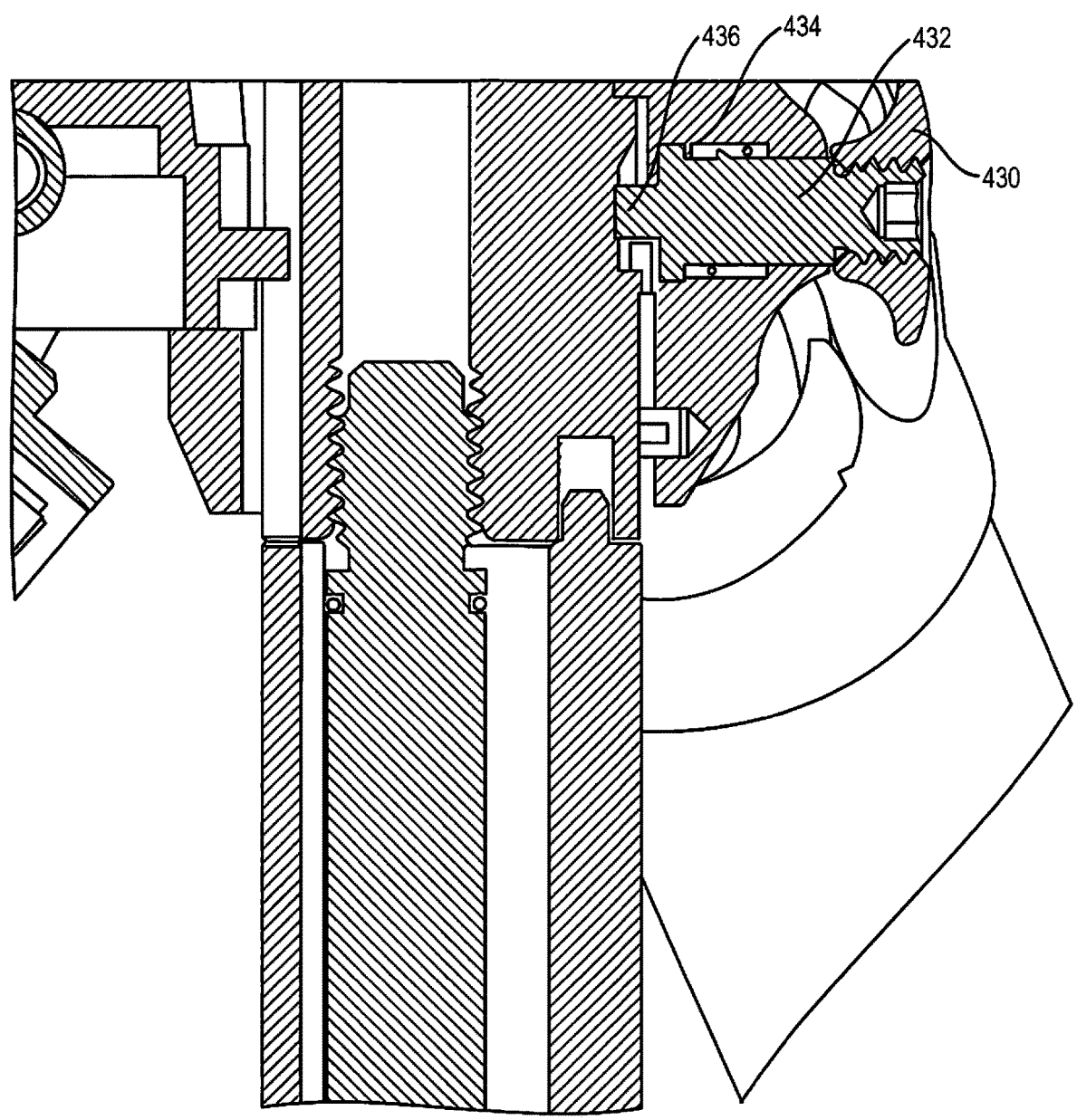
FIG. 30 illustrates the apex and the safety pull knob assembly.

Referring again to FIG. 4, the center column 130 may define a respective slit 380 on each lobe of the center column 130 proximate the lower end of the center column 130. The plastic sleeves 230 define a respective opening defined therein that is consistent with the respective slit 380. Referring to FIG. 28 and FIG. 29, the apex 200 may retain therein a safety pull knob 430, a safety pin 432 threadably secured to the safety pull knob 430, and a safety spring 434 arranged over the safety pin 432. Referring also to FIG. 30, an end protrusion 436 of the safety pin 432 is biased so that the end protrusion 436 is in pressing engagement with the plastic sleeve 230 and/or the center column 130. As the center column 130 is raised, the end protrusion 436 will be automatically engaged with a respective slit 380 in the center column 130, thereby inhibiting further raising of the center column 130. This reduces the likelihood of raising the center column 130 to high and the center column 130, including any equipment supported thereon, from becoming inadvertently detached from the apex 200. In addition, by retracting the safety pull knob 430, the end protrusion 436 is disengaged with the respective slit 380 thereby permitting the center column 130 to be further raised and detached from the apex 200. Further, the safety pull knob 430, the safety pin 432, and the safety spring 434 likewise operates to inhibit the center column 130 from being inadvertently being detached from the apex, when the center column 130 is attached upside down, suspending the equipment from the apex 200 via the column.

Figure 37:
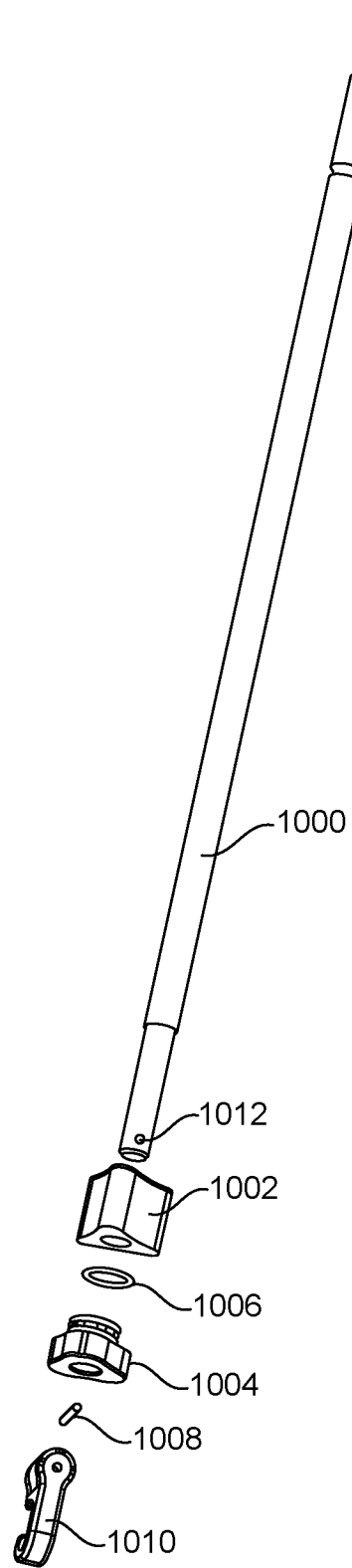
FIG. 37 illustrates another embodiment of a portion of a central portion of the central column.

Referring to FIG. 37, in another embodiment, a center piece of the column may include a central shaft 1000 that extends through a seal member 1002 having an exterior shape that substantially matches that of the interior of the central column. The seal member 1010 substantially inhibits debris and other materials from entering the central column. Also, it retains the rod within the lower column section when the lower column section is not attached to the upper column section. The step created by the necked down section on the rod is what the seal member 1002 catches on to keep the rod retained. The central shaft 1000 also extends through an end member 1004 and includes an O-ring 1006 to substantially inhibit debris and other materials from entering the central column. The central shaft 1000 partially extends within a hook 1010, which is secured in place with a pin 1008 through a hole 1012 defined by the central shaft 1000.

Figure 38:
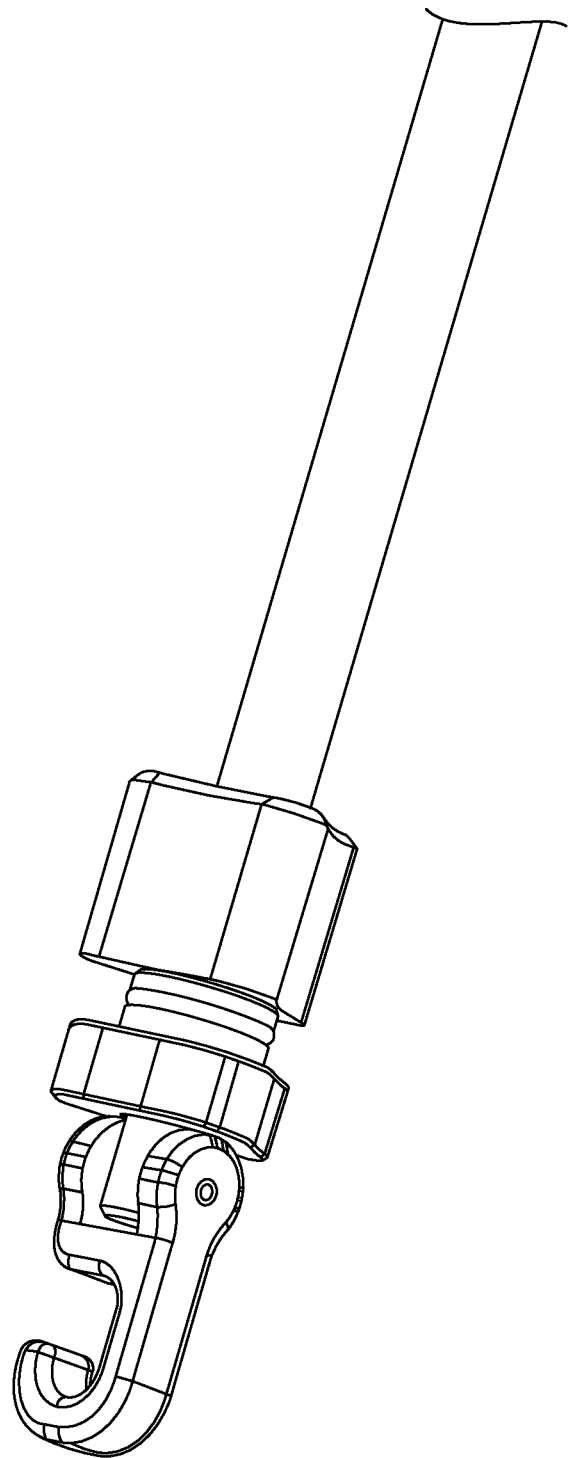
FIG. 38 illustrates an end portion of the embodiment of FIG. 37.
Figure 39:
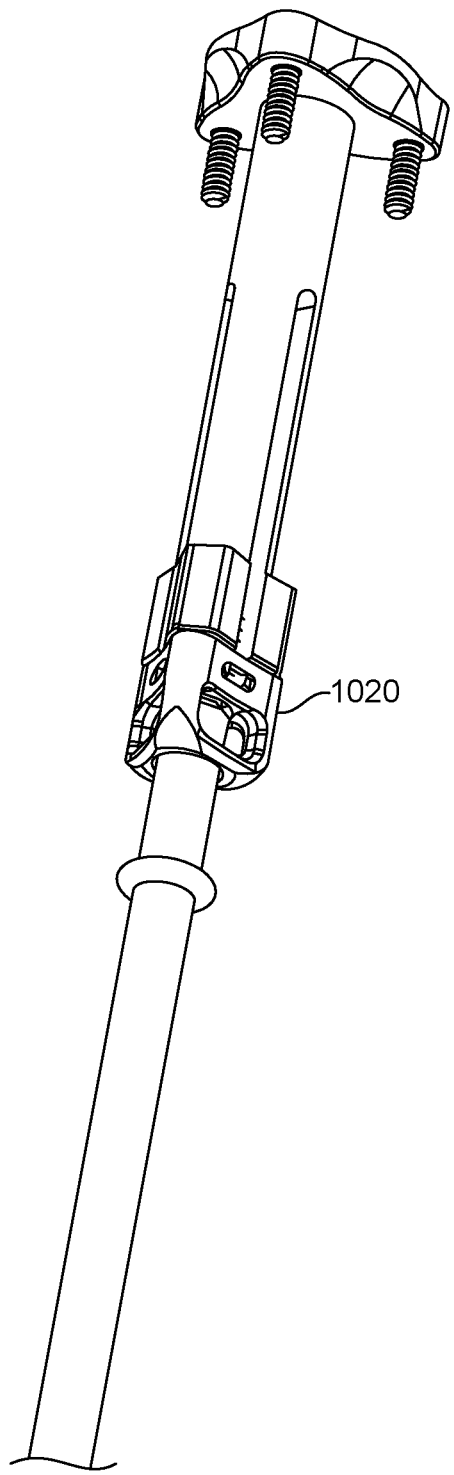
FIG. 39 illustrates another embodiment of a portion of a central portion of the central column showing a three-way split body.
Figure 40:
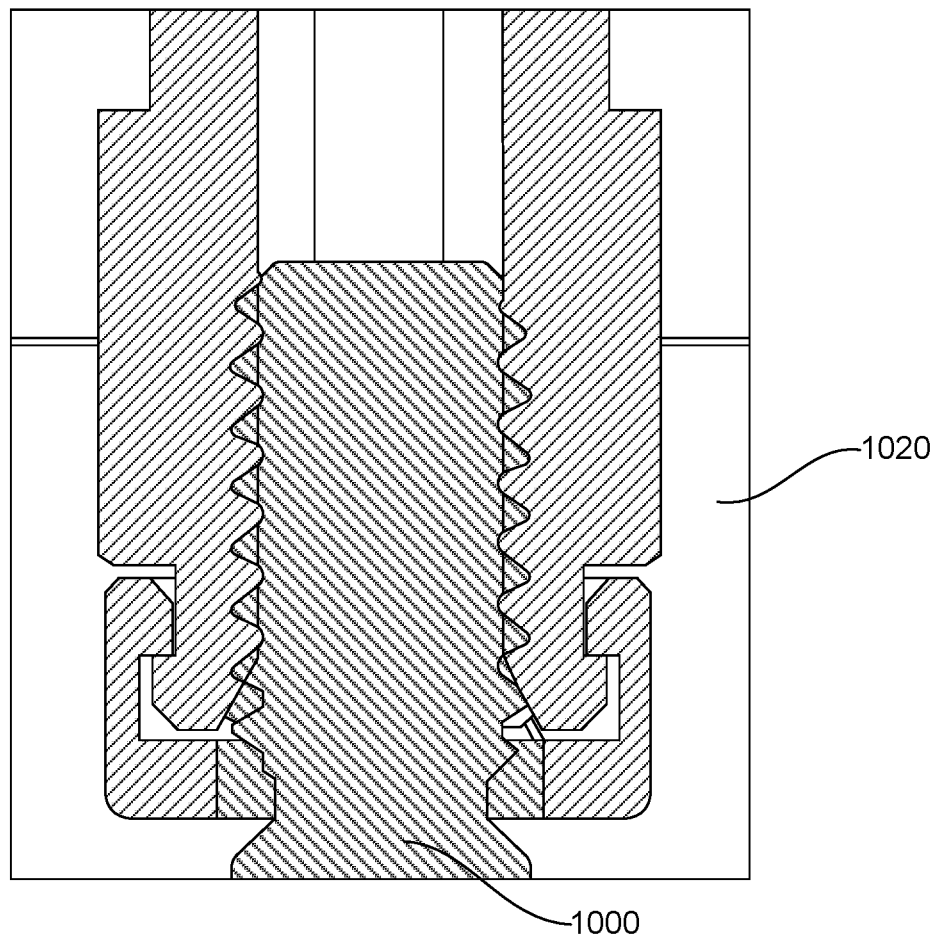
FIG. 40 illustrates a cross-sectional view of the three-way split body of FIG. 39.

Referring also to FIG. 38, the central assembly includes the hook 1010 which acts as a cam lever and a twistable knob. The hook 1010 is preferably initially rotated about the pin 1012 and second about the central shaft 1000. Referring also to FIG. 39, rotating the hook 1010 rotates the central shaft 1000, and threads and unthreads the lower column section from the upper column section. The cam action of the hook 1010 permits the user to achieve an even stiffer connection between the two column sections while still being able to remove it without a tool. Referring also to FIG. 40, as it may be observed, the central shaft 1000 used to attach the lower column section threads into a three-way split body 1020 that has a similar profile to the inner profile of the two column sections and it extends across their intersection plane. Due to the force of the central shaft 1000 on the threads, the two column sections are aligned with one another by the three-way split body 1020. The three-way split body 1020, is proximate the location between the two column sections. The upper portion of the three-way split body 1020 is maintained in a fixed rotational position with respect to the upper column and a fixed positional location. The lower portion of the three-way split body 1020 is rotatable with respect to the upper column. The three-way split body 1020 permits the two column sections to align with respect to one another, and with the tightening of the central shaft 1000, they are maintained in a fixed relationship with respect to one another. In addition, the upper portion of the three-way split body 1020 which is substantially similar to the interior shape of the lower column inhibits rotation of the lower column with respect to the upper column. Also, the lower portion of the center column may be removed together with the center column, to reduce the weight. With the shortened configuration, a weight may be secured to the rotational portion of the three-way split body 1020.

Figure 31:
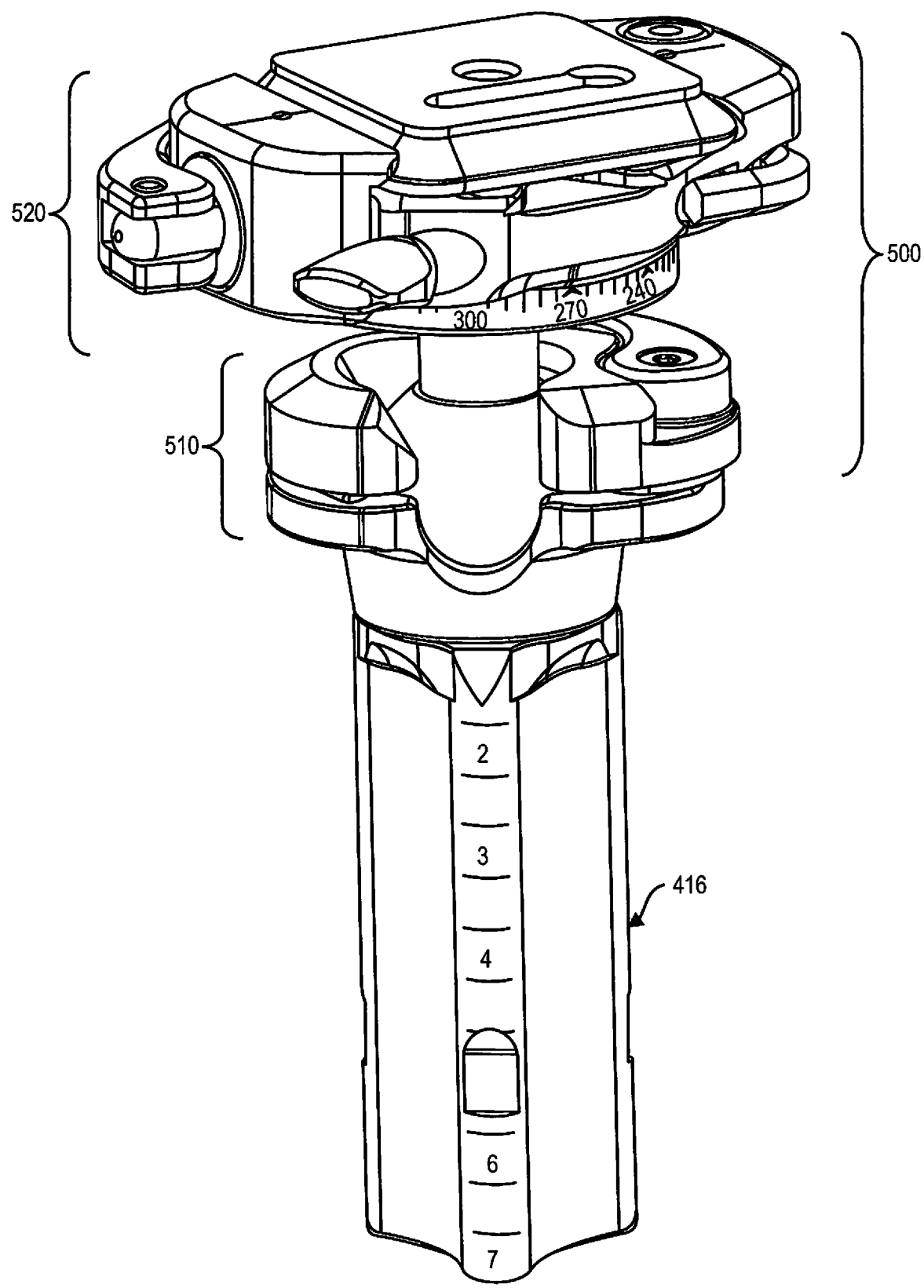
FIG. 31 illustrates a ball assembly and a clamp assembly.
Figure 32:
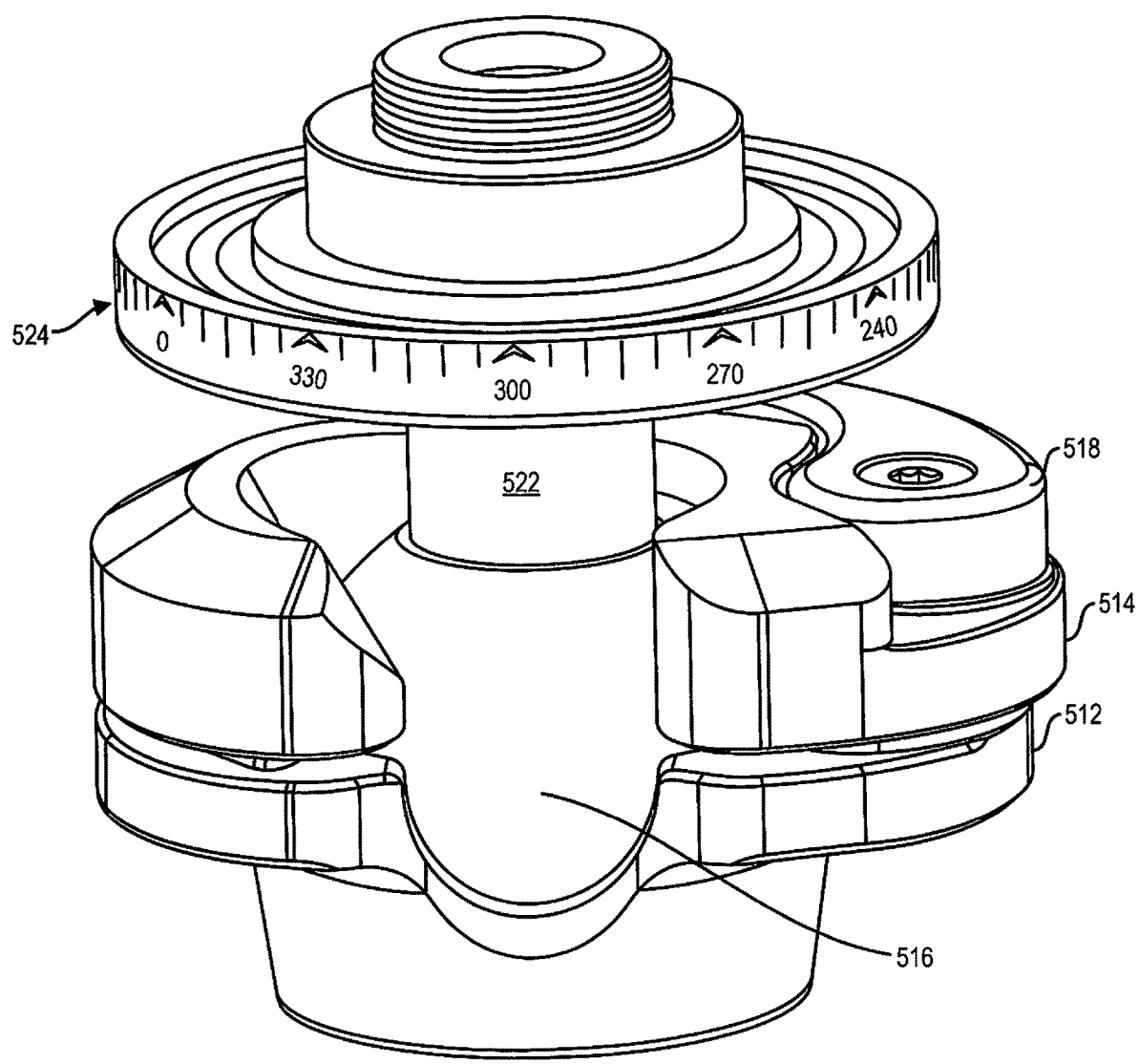
FIG. 32 illustrates the ball assembly.

Referring to FIG. 31, an equipment support 500 may include a ball assembly 510 and a clamp assembly 520, if desired. Referring also to FIG. 32, the ball assembly 510 may include a lower ball head retainer 512 and an upper ball head retainer 514 that collectively retain a rotatable ball 516 maintained therein. A lever lock assembly 518, by rotation thereof, may selectively cause the lower ball head retainer 512 and the upper ball head retainer 514 to selectively inhibit the rotatable ball 516 from moving therein. The rotatable ball 516 may include a stem 522 and upper support 524 to support the clamp assembly 520 thereon. The clamp assembly 520 is suitable to detachably interconnect with equipment, such as an imaging device. The ball assembly 510 is arranged to freely permit the ball of the ball assembly 510 to (1) tilt, (2) yaw, and (3) roll.

Figure 33:
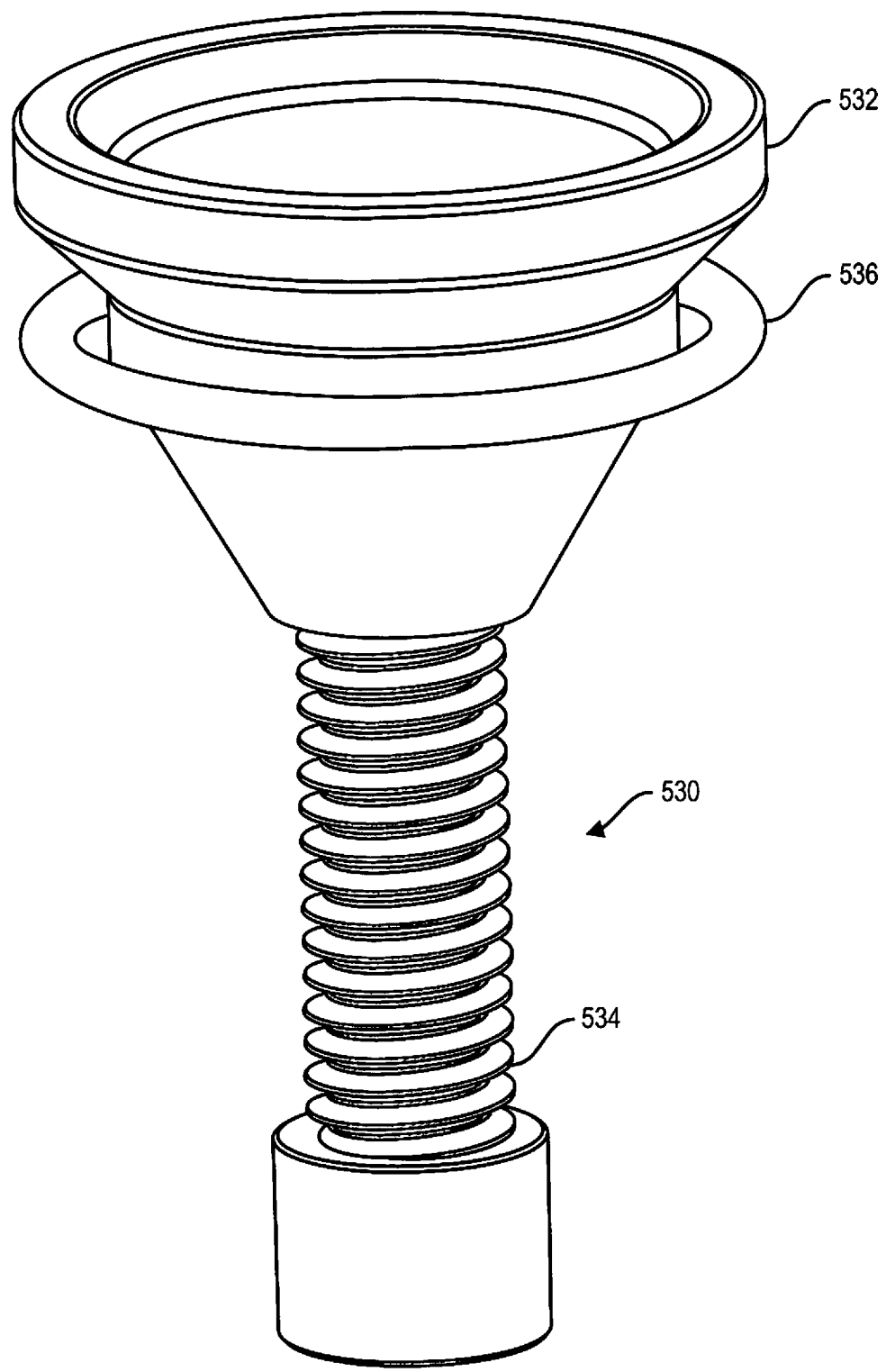
FIG. 33 illustrates a lower pan assembly of an equipment support.

Referring to FIG. 33, the equipment support 500, may include a lower pan assembly 530 that includes a pan base 532, a machine head 534, and an O-ring 536. The machine head 534 is retained by the upper section 416 by a constricted portion (e.g., so the machine head is prevented from being removed from the upper section through the upper opening and accordingly is removed through the lower opening of the upper section) and sufficiently tightened to the pan base 532 to hold the lower pan assembly 530 in place while permitting rotation of the pan base 532. The pan base 532 is secured to the lower ball head retainer 512. In another embodiment, machine head is "flipped", where the head is on top and the retaining is performed by the pan base. In such a configuration, the machine head is not readily removable without the ball being removed. In such a configuration, the machine head is screwed into the flexure which is then attached to the upper section of the column. In this manner, the equipment support 500 and any devices supported thereon, may be freely rotated based upon a lower pan assembly 530 that is located, at least partially, below the plane of the bottom and/or the top of the rotatable ball 516.

Figure 34:
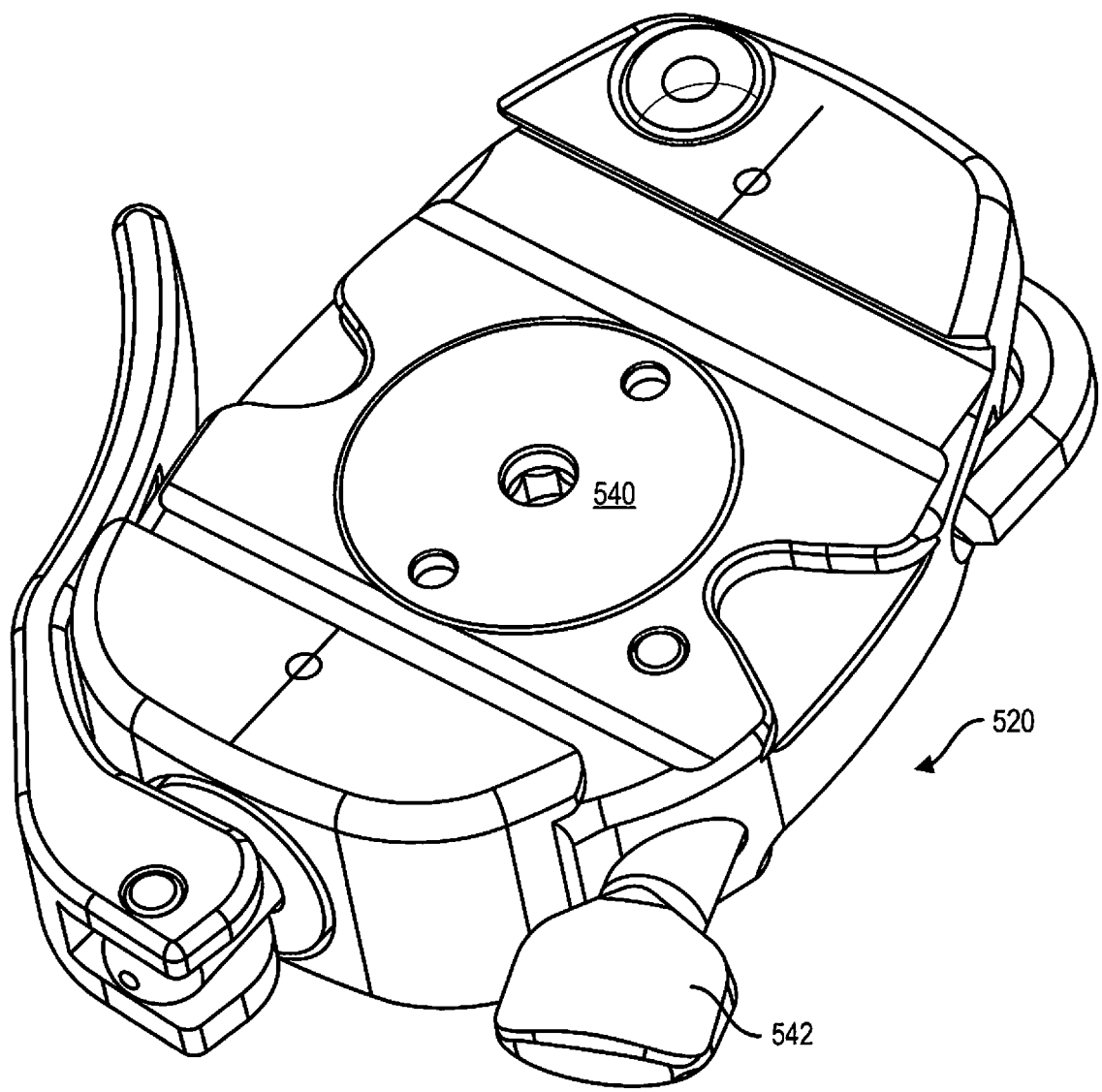
FIG. 34 illustrates an upper view of the clamp assembly.
Figure 35:
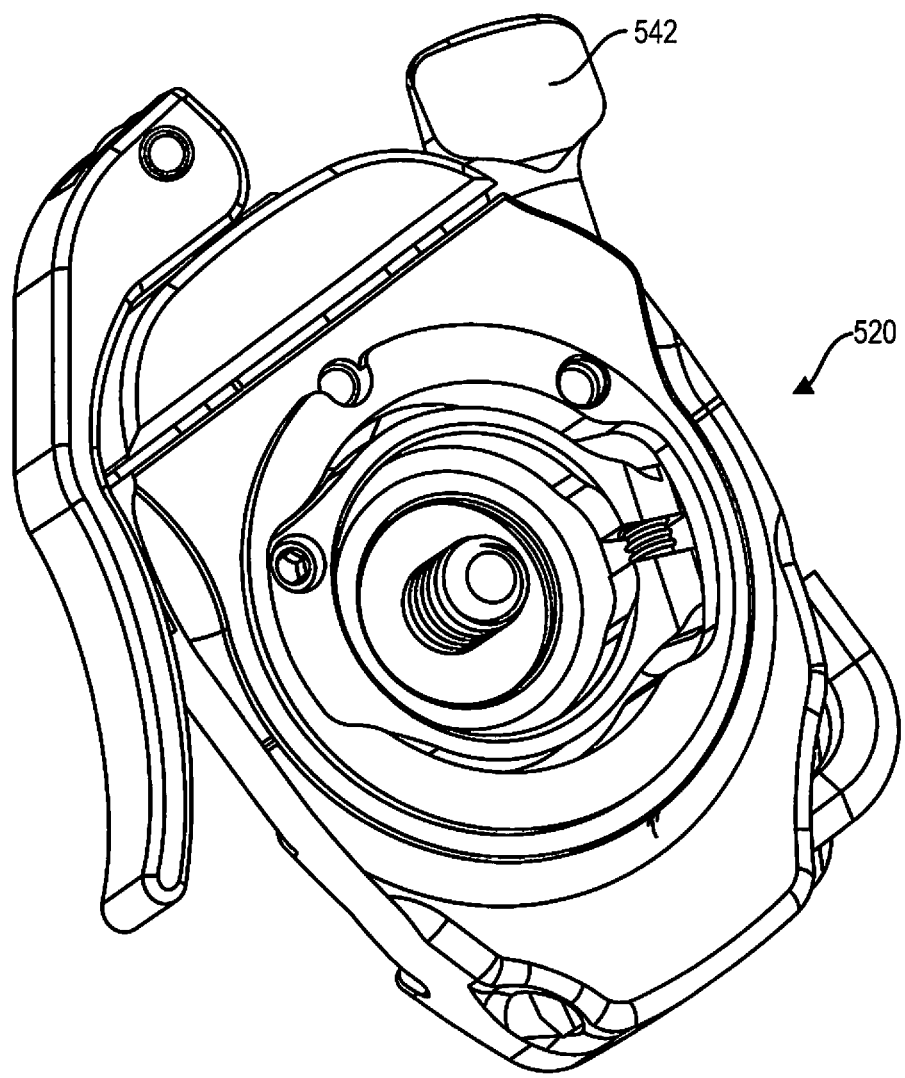
FIG. 35 illustrates a lower view of the clamp assembly.

Referring to FIG. 34 and FIG. 35, the clamp assembly 520 may include an upper pan assembly with a center plate 540 that is interconnected to a rotatable member 542 to selectively inhibit the clamp assembly 520 from freely rotating with respect to the center plate 540. The rotatable member 542 may use any suitable structure to selectively inhibit rotation. The clamp assembly 520 may include any suitable structure to provide a panning rotation that may include selective locking from panning rotation. In this manner, the equipment support 500 and any devices supported thereon, may be freely rotated based upon the upper pan assembly that is located, at least partially, above the plane of the top and/or bottom of the rotatable ball 516.

The tripod with integrated ball head includes the lower panning base supported by the central column and an upper panning base supported by the central column which are separated, at least in part, by the ball. In this manner, the tripod includes a combination of (1) a telescoping column, (2) a pan base at least partially below a portion of the ball, (3) a pan base at least partially above a portion of the ball, (4) a ball that tilts, (5) a ball that yaws, and (6) a ball that rolls.

Figure 36:
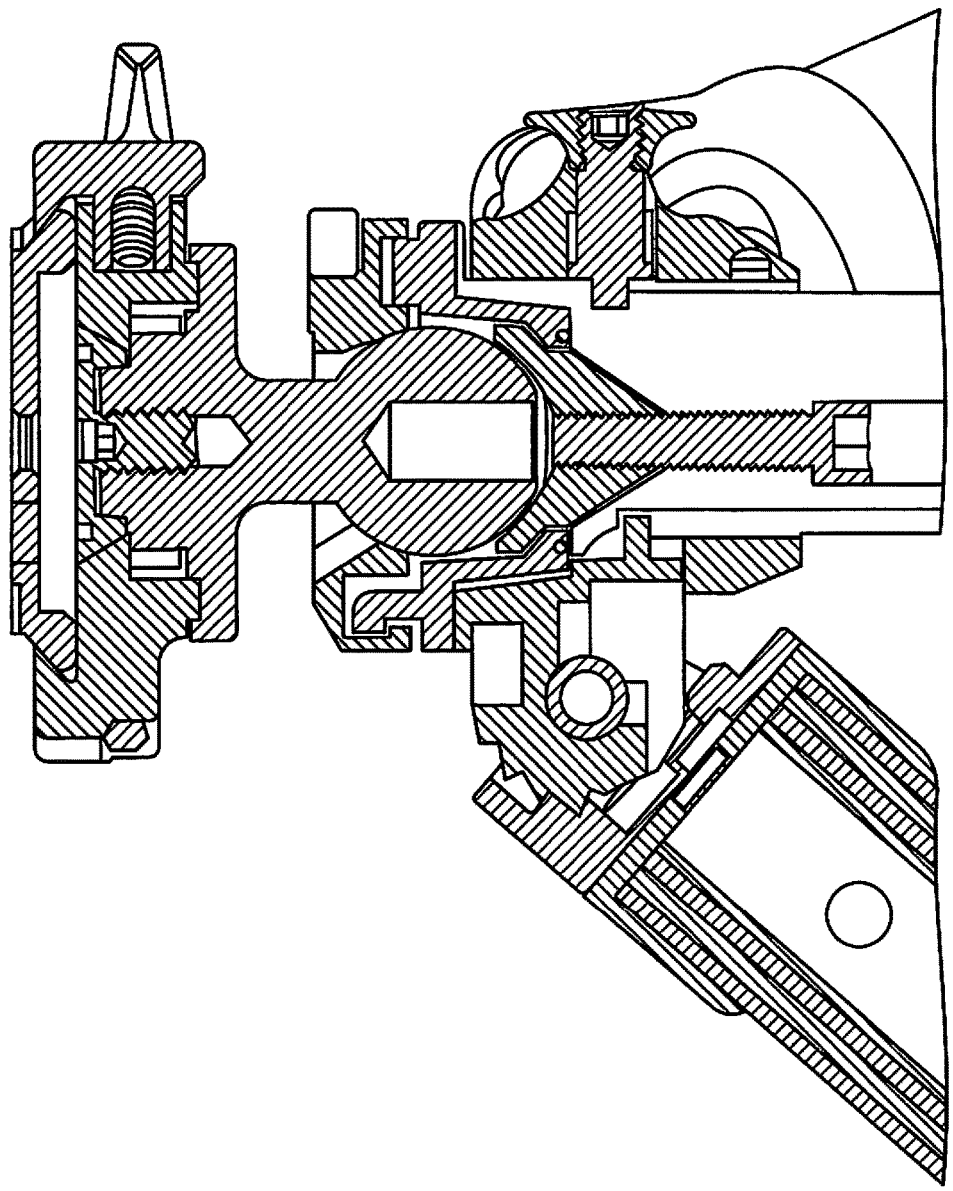
FIG. 36 illustrates the ball assembly and clamp assembly in a retracted position.

Referring to FIG. 36, the ball assembly 510 which is supported by the central column 130 may be at least partially retracted within the apex 200. In this manner, at least a part of the ball is retracted below the upper surface of the apex 200. The nesting of the ball at least partially below the upper surface of the apex permits a compact and collapsed size. Even when in the fully retracted position, the tripod includes a combination of (1) a telescoping column, (2) a pan base at least partially below a portion of the ball, (3) a pan base at least partially above a portion of the ball, (4) a ball that tilts, (5) a ball that yaws, and (6) a ball that rolls.

In another embodiment, there may be multiple safety stop configurations for the center column employed with the single tripod assembly, such as one safety stop configuration for a longer column configuration and another safety stop configuration for a shorter column configuration. Both safety stop configurations may act in a similar manner. A triangular profile rotates into 6 indexed positions, 3 of which the safety stop is engaged and 3 of which the safety stop is disengaged. When the safety stop is engaged the triangular profiles makes contact with the tripod apex, stopping the column from being removed. When the safety stop is disengaged the triangular profiles does not make contact with the tripod apex, thereby not stopping the column from being removed. Both of these safety stops are set by the user and left in the engaged or disengaged position. Also, both of the safety stops operate in a standard or inverted orientation.

Figure 41:
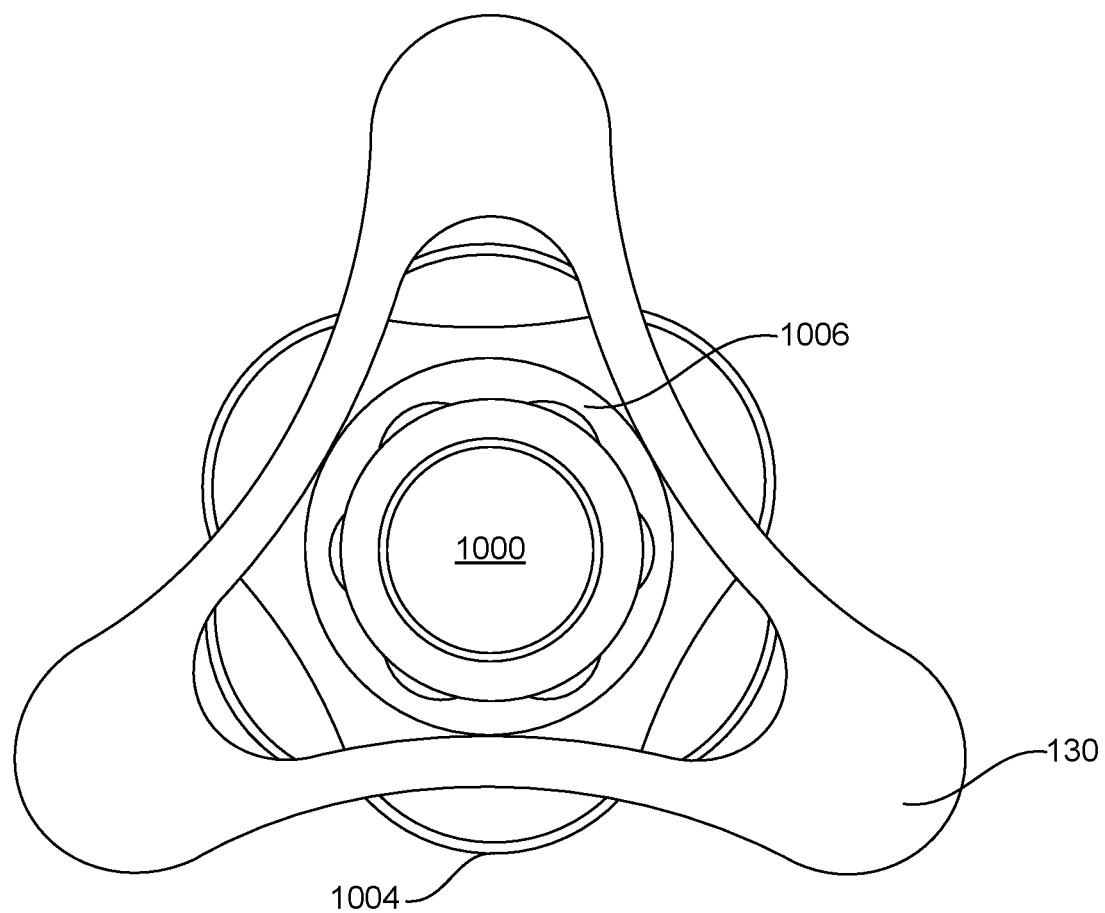
FIG. 41 illustrates a bottom view of the center column in a locked configuration.

Referring again to FIG. 37 and FIG. 38, the end member 1004 preferably has a triangular shape that when rotated into a first configuration its exterior periphery come into alignment with the exterior periphery of the end portion of the lower column in such a manner that none of the end member 1004 extends beyond the exterior surface of the center column, as illustrated in FIG. 41. The end member 1004 is rotatable into a second configuration where its exterior periphery is out of alignment with the exterior periphery of the end portion of the lower column in such a manner at least part of the end member 1004 extends beyond the exterior surface of the center column. It is noted that the hex shaped profile inside the column and the O-ring together form index points by having spots of high and low O-ring compression. Referring again to FIG. 10, the apex 200 may define a set of one or more flanges 241 with curved arches that are substantially matching the convex surfaces of the center column 130. The end member 1004 is rotated in a manner in alignment with the center column 130 and engaged within the apex 200. Thereafter, if it is desirable to engage a safety stop of the center column from inadvertently becoming disengaged from the apex, the end member 1004 is rotated such that a portion of its surfaces extend beyond the exterior surface of the center column. In such a configuration, the center column is prevented from becoming disengaged from the apex and otherwise removed until the end member is aligned with the center column.

Referring again to FIG. 39, for the short column configuration, the triangular safety stop profile is attached to the three-way split body 1020. The three-way split body 1020 rotational portion preferably has a triangular shape that when rotated into a first configuration its exterior periphery come into alignment with the exterior periphery of the end portion of the upper column in such a manner that none of the end member 1004 extends beyond the exterior surface of the center column. The three-way split body 1020 rotational portion is rotatable into a second configuration where its exterior periphery is out of alignment with the exterior periphery of the end portion of the upper column in such a manner at least part of the three-way split body 1020 rotational portion extends beyond the exterior surface of the center column. Referring again to FIG. 10, the apex 200 may define a set of one or more flanges 241 with curved arches that are substantially matching the convex surfaces of the center column 130. The three-way split body 1020 rotational portion is rotated in a manner in alignment with the center column 130 and engaged within the apex 200. Thereafter, if it is desirable to engage a safety stop of the center column from inadvertently becoming disengaged from the apex, the three-way split body 1020 rotational portion is rotated such that a portion of its surfaces extend beyond the exterior surface of the center column. In such a configuration, the center column is prevented from becoming disengaged from the apex and otherwise removed until the three-way split body 1020 rotational portion is aligned with the center column. The rotational portion of the three-way split body 1020 may include deformable interior portions so that it is indexed to its positions.

Figure 42:
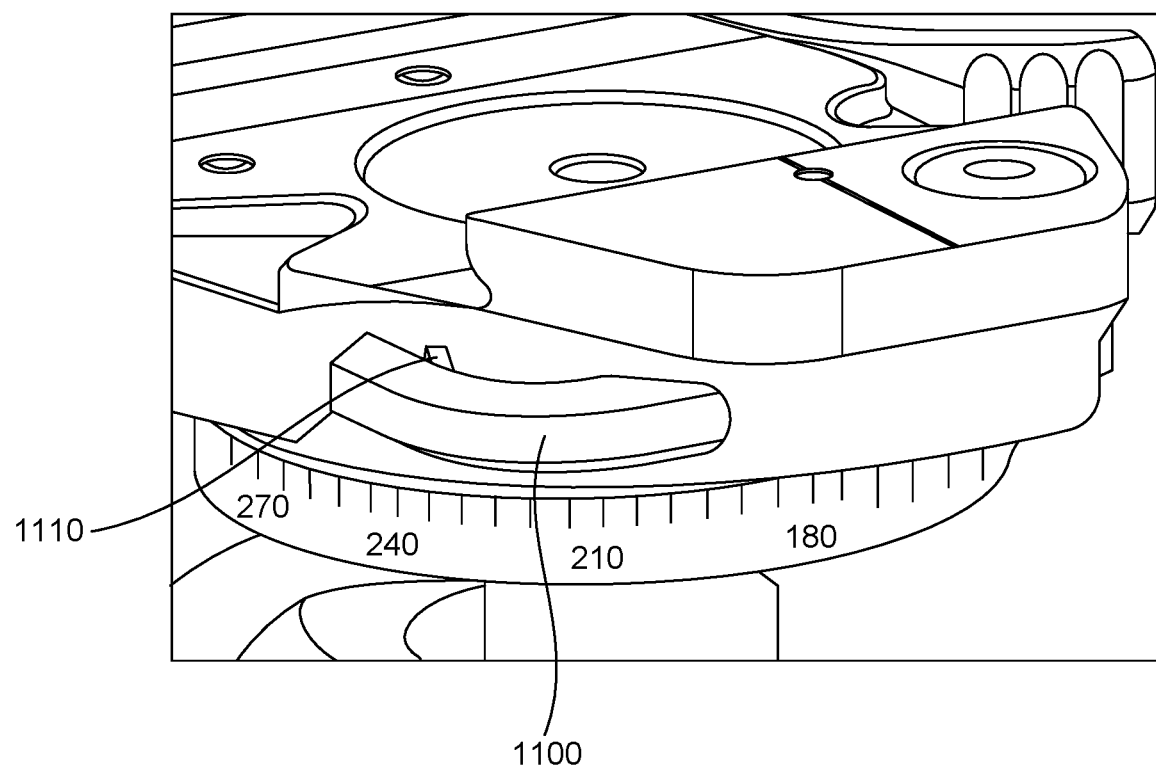
FIG. 42 illustrates another embodiment with of a clamp including an integrated hex screw.

Referring to FIG. 42, a smaller sized 5/32 hex key 1100 may be included within an integrated storage location in the clamp. A magnet 1110 may be included to magnetically secure the hex key 1100 in place to inhibit it from becoming inadvertently detached.

Figure 44:
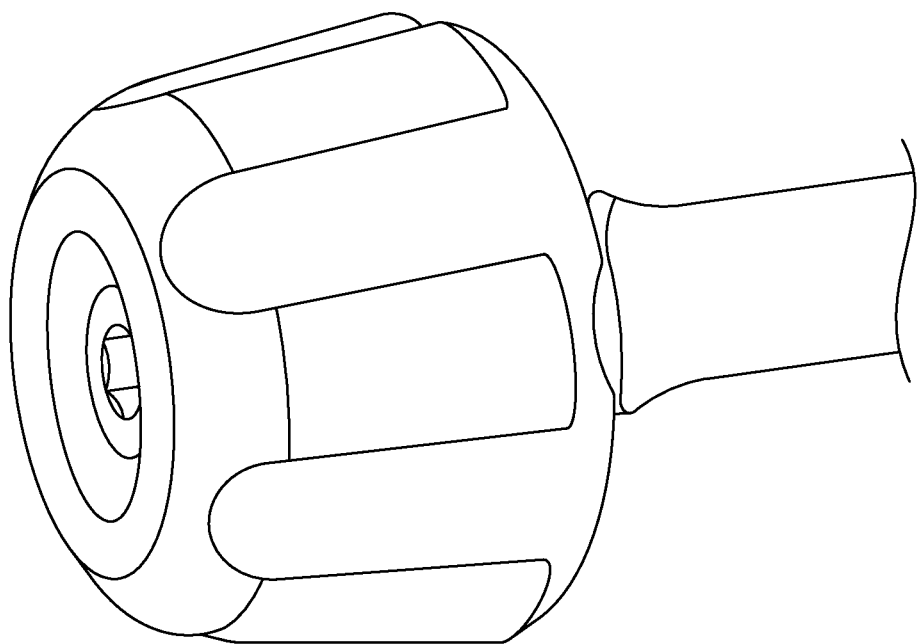
FIG. 44 illustrates a large knob extension.

Referring to FIG. 44, a larger knob extension may be added to the existing panning lock know. The larger knob tends to make it easier to adjust the pan lock up if the user is wearing gloves or has large fingers. The knob extension fits over the existing knob and secured in place with a screw.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A support having an apex comprising:
   (a) at least one elongate leg at least partially supporting said apex, where said at least one elongate leg is movable with respect to said apex;
   (b) a center column engaged with and selectively movable vertically with respect to said apex;

(c) said center column suitable for detachably securing equipment thereto;

(d) said center column having at least one concave exterior face, where said concave exterior face defines a smoothly curved surface that curves inwardly;

(e) said apex defines at least one convex exterior face, where said convex exterior face defines a smoothly curved surface that curves outwardly, where said at least one concave exterior face and said convex exterior face are aligned with one another when said center column is selectively movable vertically with respect to said apex;

(f) said center column including an upper center column and a lower center column that are detachably engageable with one another, where said upper center column includes an upper portion of said smoothly curved surface, where said lower center column includes a lower portion of said smoothly curved surface;

(g) said upper portion of said smoothly curved surface and said convex exterior face are aligned with one another when said center column is selectively movable when said upper center column engaged with said apex;

(h) said lower portion of said smoothly curved surface and said convex exterior face are aligned with one another when said center column is selectively movable when said lower center column is engaged with said apex;

(i) wherein when said upper center column and said lower center column are engaged with one another, the center column is said selectively movable vertically between said upper portion of said smoothly curved surface engaged with said apex and said lower portion of said smoothly curved surfaced engaged with said apex.

2. The support of claim 1 further comprising at least three said elongate legs at least partially supporting said apex.

3. The support of claim 1 wherein said at least three said elongate legs are tubular.

4. A support having an apex comprising:
(a) three elongate legs at least partially supporting said apex, where each of said three elongate legs are movable with respect to said apex;
(b) a center column engaged with and selectively movable vertically with respect to said apex;
(c) said center column suitable for detachably securing equipment thereto;
(d) said center column having three concave exterior faces, where each of said concave exterior faces defines a smoothly curved surface that curves inwardly;
(e) said apex defines three convex exterior faces, where each of said convex exterior faces defines a smoothly curved surface that curves outwardly, where each of said three concave exterior faces and each of said convex exterior faces are aligned with respect one another when said center column is selectively movable vertically with respect to said apex;
(f) said center column having three lobes each of which including a smoothly curved convex exterior surface that interconnect respective pairs of said three smoothly curved concave exterior faces;
(g) said center column having an exterior periphery comprising said three lobes each of which having said smoothly curved convex exterior surface and said three smoothly curved concave exterior faces, where said exterior periphery includes no edges forming a discontinuity.

5. The apex of claim 4 further comprising:
(a) said end member including a curved hook;
(b) said end member including a peripheral surface shaped such that when rotated into a first configuration the peripheral surface is in alignment with an exterior periphery of said center column such that none of the peripheral surface of said end member extends beyond the exterior periphery of said center column;
(c) said end member including said peripheral surface shaped such that when rotated into a second configuration the peripheral surface is out of alignment with the exterior periphery of said center column such that at least a portion of said peripheral surface of said end member extends beyond the exterior periphery of said center column;
(d) said end member when in said first configuration is removable from said apex by raising said center column through said apex;
(e) said end member when in said second configuration is not removable from said apex by raising said center column through said apex.

6. The support of claim 5 wherein said end member is substantially triangular in shape.

7. The support of claim 4 further comprising:
(a) a movable lever that presses against a plunger to selectively inhibit said center column from moving with respect to said apex;
(b) said plunger pressing against a first sleeve when said lever is lowered where said first sleeve presses against said center column to said inhibit said center column from moving with respect to said apex;
(c) said first sleeve positioned within said apex and arranged to said press against a first lobe of said center column;
(d) a second sleeve positioned within said apex and arranged to said engage against a second lobe of said center column when said lever is lowered;
(e) a third sleeve positioned within said apex and arranged to said engage against a third lobe of said center column when said lever is lowered.

8. A support having an apex comprising:
(a) three elongate legs at least partially supporting said apex, where each of said three elongate legs are movable with respect to said apex;
(b) a center column engaged with and selectively movable vertically with respect to said apex;
(c) said center column suitable for detachably securing equipment thereto;
(d) said center column having three concave exterior faces, where each of said concave exterior faces defines a smoothly curved surface that curves inwardly;
(e) said center column including an end member rotatably secured at a lower end of said center column;
(f) said end member including a hook;
(g) said end member including a peripheral surface shaped such that when rotated into a first configuration the peripheral surface is in alignment with an exterior periphery of said center column such that none of the peripheral surface of said end member extends beyond the exterior periphery of said center column;
(h) said end member including said peripheral surface shaped such that when rotated into a second configuration the peripheral surface is out of alignment with the exterior periphery of said center column such that at least a portion of said peripheral surface of said end member extends beyond the exterior periphery of said center column;

(i) said end member when in said first configuration is removable from said apex by raising said center column through said apex;

(j) said end member when in said second configuration is not removable from said apex by raising said center column through said apex.

9. The support of claim 8 wherein said end member is substantially triangular in shape.

10. The support of claim 8 further comprising:
(a) said apex defines three convex exterior faces, where each of said convex exterior faces defines a smoothly curved surface that curves outwardly, where each of said three concave exterior faces and each of said convex exterior faces are aligned with respect one another when said center column is selectively movable vertically with respect to said apex;
(b) said center column having three lobes each of which including a smoothly curved convex exterior surface that interconnect respective pairs of said three smoothly curved concave exterior faces;
(c) said center column having an exterior periphery comprising said three lobes each of which having said smoothly curved convex exterior surface and said three smoothly curved concave exterior faces, where said exterior periphery includes no edges forming a discontinuity.

11. The support of claim 10 further comprising:
(a) a lever that presses against a plunger to selectively inhibit said center column from moving with respect to said apex;
(b) said plunger pressing against a first sleeve when said lever is lowered where said first sleeve presses against said center column to said inhibit said center column from moving with respect to said apex;
(c) said first sleeve positioned within said apex and arranged to said press against a first lobe of said center column;
(d) a second sleeve positioned within said apex and arranged to said engage against a second lobe of said center column when said lever is lowered;
(e) a third sleeve positioned within said apex and arranged to said engage against a third lobe of said center column when said lever is lowered.

12. A support having an apex comprising:
(a) three elongate legs at least partially supporting said apex, where each of said three elongate legs are movable with respect to said apex;
(b) a center column engaged with and selectively movable vertically with respect to said apex;
(c) said center column suitable for detachably securing equipment thereto;
(d) said center column having three concave exterior faces, where each of said concave exterior faces defines a smoothly curved surface that curves inwardly, said center column defining three lobes where each lobe is between a corresponding pair of said concave exterior faces;
(e) said apex defines three convex exterior faces, where each of said convex exterior faces of said apex defines a smoothly curved surface that curves outwardly, where each of said three concave exterior faces of said center column and each of said convex exterior faces of said apex are aligned with respect one another when said center column is selectively movable vertically with respect to said apex;
(f) a movable lever that presses against a plunger to selectively inhibit said center column from moving with respect to said apex;
(g) said plunger pressing against a first sleeve when said lever is lowered where said first sleeve presses against said center column to said inhibit said center column from moving with respect to said apex;
(h) said first sleeve positioned within said apex and arranged to said press against a first lobe of said center column;
(i) a second sleeve positioned within said apex and arranged to said engage against a second lobe of said center column when said lever is lowered;
(j) a third sleeve positioned within said apex and arranged to said engage against a third lobe of said center column when said lever is lowered.

\* \* \* \* \*